(12) United States Patent
Cowburn et al.

(10) Patent No.: US 8,078,875 B2
(45) Date of Patent: *Dec. 13, 2011

(54) VERIFICATION OF AUTHENTICITY

(75) Inventors: Russell Paul Cowburn, London (GB); James David Ralph Buchanan, London (GB)

(73) Assignee: Ingenia Holdings Limited, Tortola (VG)

( * ) Notice: Subject to any disclaimer, the term of this patent is extended or adjusted under 35 U.S.C. 154(b) by 929 days.

This patent is subject to a terminal disclaimer.

(21) Appl. No.: 11/460,558

(22) Filed: Jul. 27, 2006

(65) Prior Publication Data

US 2007/0028093 A1     Feb. 1, 2007

Related U.S. Application Data

(60) Provisional application No. 60/702,732, filed on Jul. 27, 2005.

(30) Foreign Application Priority Data

Jul. 27, 2005 (GB) .................................. 0515460.4

(51) Int. Cl.
*H04L 9/32*     (2006.01)

(52) U.S. Cl. ........ 713/176; 713/156; 713/175; 713/177; 713/180; 382/100; 382/218; 358/448; 358/474; 358/488; 726/2; 726/4; 726/17; 726/27; 726/28; 726/29; 726/30; 705/5; 235/375; 235/462.01; 235/494

(58) Field of Classification Search .................. 713/155, 713/156, 175–177, 180; 235/382, 375, 462.01, 235/494; 382/141, 100, 218; 358/448, 474, 358/488; 726/2, 4, 17, 27–30; 705/75
See application file for complete search history.

(56) References Cited

U.S. PATENT DOCUMENTS

| | | |
|---|---|---|
| 3,781,109 A | 12/1973 | Mayer, Jr. et al. |
| 3,877,019 A | 4/1975 | Auerbach et al. |
| 4,179,212 A | 12/1979 | Lahr |
| 4,218,674 A | 8/1980 | Brosow et al. |

(Continued)

FOREIGN PATENT DOCUMENTS

CN     1588847     3/2005

(Continued)

OTHER PUBLICATIONS

International Search Report issued by UK Intellectual Property Office, Mar. 28, 2008.

(Continued)

*Primary Examiner* — Thanhnga B Truong
(74) *Attorney, Agent, or Firm* — McDonnell Boehnen Hulbert & Berghoff LLP

(57) ABSTRACT

An article identification method can comprise: determining a signature from an article based upon an intrinsic characteristic of the article; and comparing the determined signature to a stored signature. The method can also comprise splitting the determined signature into blocks of contiguous data, performing a comparison operation between each block and respective blocks of the stored signature, and comparing an attribute of a comparison result from each block comparison to an expected attribute of the block comparison to determine a compensation value for use in determining a comparison result. The method can also comprise determining a similarity result between the determined signature and the stored signature, using the compensation value to adjust the determined signature. Thus an article damaged by stretching or shrinking can be successfully identified. Also, a non-linear signature determination can be accommodated without losing identification accuracy.

30 Claims, 14 Drawing Sheets

U.S. PATENT DOCUMENTS

| | | | |
|---|---|---|---|
| 4,423,415 A | 12/1983 | Goldman | |
| 4,525,748 A | 6/1985 | Carbone | |
| 4,537,504 A | 8/1985 | Baltes et al. | |
| 4,544,266 A | 10/1985 | Antes | |
| 4,568,936 A | 2/1986 | Goldman | |
| 4,599,509 A * | 7/1986 | Silverman et al. | 235/382 |
| 4,738,901 A | 4/1988 | Finkel et al. | |
| 4,748,316 A | 5/1988 | Dickson | |
| 4,785,290 A | 11/1988 | Goldman et al. | |
| 4,791,669 A | 12/1988 | Kage | |
| 4,797,921 A | 1/1989 | Shiraishi | |
| 4,817,176 A | 3/1989 | Marshall et al. | |
| 4,820,912 A | 4/1989 | Samyn | |
| 4,920,385 A | 4/1990 | Clarke et al. | |
| 4,929,821 A | 5/1990 | Kocznar et al. | |
| 5,003,596 A | 3/1991 | Wood | |
| 5,054,066 A | 10/1991 | Riek et al. | |
| 5,058,164 A | 10/1991 | Elmer et al. | |
| 5,059,776 A | 10/1991 | Antes | |
| 5,081,675 A | 1/1992 | Kittirutsunetorn | |
| 5,103,479 A | 4/1992 | Takaragi et al. | |
| 5,120,126 A | 6/1992 | Wertz et al. | |
| 5,133,601 A * | 7/1992 | Cohen et al. | 356/497 |
| 5,142,578 A | 8/1992 | Matyas et al. | |
| 5,194,918 A * | 3/1993 | Kino et al. | 356/497 |
| 5,243,405 A | 9/1993 | Tichenor et al. | |
| 5,258,605 A | 11/1993 | Metlitsky et al. | |
| 5,306,899 A | 4/1994 | Marom et al. | |
| 5,307,423 A | 4/1994 | Gupta et al. | |
| 5,325,167 A | 6/1994 | Melen | |
| 5,384,717 A * | 1/1995 | Ebenstein | 702/167 |
| 5,451,759 A | 9/1995 | Hoshino et al. | |
| 5,453,840 A * | 9/1995 | Parker et al. | 356/400 |
| 5,485,312 A * | 1/1996 | Horner et al. | 359/561 |
| 5,488,661 A | 1/1996 | Matsui | |
| 5,510,199 A | 4/1996 | Martin | |
| 5,521,984 A | 5/1996 | Denenberg et al. | |
| 5,539,840 A | 7/1996 | Krtolica et al. | |
| 5,546,462 A | 8/1996 | Indeck et al. | |
| 5,637,854 A | 6/1997 | Thomas | |
| 5,647,010 A | 9/1997 | Okubo et al. | |
| 5,673,338 A | 9/1997 | Denenberg et al. | |
| 5,687,002 A | 11/1997 | Itoh | |
| 5,760,386 A | 6/1998 | Ward | |
| 5,767,988 A | 6/1998 | Dobbs et al. | |
| 5,784,463 A | 7/1998 | Chen et al. | |
| 5,790,025 A | 8/1998 | Amer et al. | |
| 5,886,798 A | 3/1999 | Staub et al. | |
| 5,903,721 A | 5/1999 | Sixtus | |
| 5,912,974 A | 6/1999 | Holloway et al. | |
| 6,029,150 A | 2/2000 | Kravitz | |
| 6,141,119 A | 10/2000 | Tseng et al. | |
| 6,182,892 B1 | 2/2001 | Angelo et al. | |
| 6,223,166 B1 | 4/2001 | Kay | |
| 6,280,797 B1 | 8/2001 | Kuczynski et al. | |
| 6,314,409 B2 | 11/2001 | Schneck et al. | |
| 6,332,663 B1 | 12/2001 | Puzio | |
| 6,360,001 B1 | 3/2002 | Berger et al. | |
| 6,365,907 B1 | 4/2002 | Staub et al. | |
| 6,373,573 B1 | 4/2002 | Jung | |
| 6,389,151 B1 | 5/2002 | Carr et al. | |
| 6,390,368 B1 | 5/2002 | Edwards | |
| 6,466,329 B1 | 10/2002 | Mukai | |
| 6,473,165 B1 | 10/2002 | Coombs et al. | |
| 6,560,355 B2 | 5/2003 | Graves et al. | |
| 6,563,129 B1 | 5/2003 | Knobel | |
| 6,584,214 B1 | 6/2003 | Pappu et al. | |
| 6,621,916 B1 | 9/2003 | Smith et al. | |
| 6,741,360 B2 * | 5/2004 | D'Agraives et al. | 356/512 |
| 6,760,472 B1 | 7/2004 | Takeda et al. | |
| 6,779,720 B2 | 8/2004 | Lewis | |
| 6,850,147 B2 | 2/2005 | Prokoski et al. | |
| 6,882,738 B2 | 4/2005 | Davis et al. | |
| 6,928,552 B1 | 8/2005 | Mischenko et al. | |
| 6,950,094 B2 | 9/2005 | Gordon et al. | |
| 6,955,141 B2 | 10/2005 | Santanam et al. | |
| 6,970,573 B2 | 11/2005 | Carr et al. | |
| 6,977,791 B2 | 12/2005 | Zhu et al. | |
| 7,002,675 B2 | 2/2006 | Macgibbon | |
| 7,071,481 B2 | 7/2006 | Nekrasov et al. | |
| 7,076,084 B2 | 7/2006 | Davis et al. | |
| 7,077,332 B2 | 7/2006 | Verschuur et al. | |
| 7,080,041 B2 | 7/2006 | Nagel | |
| 7,082,216 B2 | 7/2006 | Jones et al. | |
| 7,111,321 B1 | 9/2006 | Watts, Jr. et al. | |
| 7,119,662 B1 | 10/2006 | Horiguchi et al. | |
| 7,143,949 B1 | 12/2006 | Hannigan | |
| 7,164,810 B2 | 1/2007 | Schnee et al. | |
| 7,170,391 B2 | 1/2007 | Lane et al. | |
| 7,200,868 B2 | 4/2007 | Mattox et al. | |
| 7,221,445 B2 | 5/2007 | Earthman et al. | |
| 7,222,361 B2 | 5/2007 | Kemper | |
| 7,333,629 B2 | 2/2008 | Patton et al. | |
| 7,336,842 B2 | 2/2008 | Kondo | |
| 7,346,184 B1 | 3/2008 | Carr et al. | |
| 7,389,530 B2 | 6/2008 | Raghunath et al. | |
| 7,391,889 B2 | 6/2008 | Kim et al. | |
| 7,497,379 B2 | 3/2009 | Chen et al. | |
| 7,506,365 B2 | 3/2009 | Hirano et al. | |
| 7,567,349 B2 | 7/2009 | Tearney et al. | |
| 7,577,844 B2 | 8/2009 | Kirovski | |
| 7,599,927 B2 | 10/2009 | Lebrat | |
| 7,599,963 B2 | 10/2009 | Fernandez | |
| 7,602,904 B2 | 10/2009 | Juels et al. | |
| 7,647,279 B2 | 1/2010 | Bourrieres et al. | |
| 7,684,069 B2 | 3/2010 | Kashiwazaki | |
| 7,716,297 B1 | 5/2010 | Wittel et al. | |
| 2002/0091555 A1 | 7/2002 | Leppink | |
| 2002/0111837 A1 | 8/2002 | Aupperle | |
| 2002/0116329 A1 | 8/2002 | Serbetcioglu et al. | |
| 2002/0146155 A1 * | 10/2002 | Mil'shtein et al. | 382/115 |
| 2003/0002067 A1 | 1/2003 | Miyano | |
| 2003/0012374 A1 | 1/2003 | Wu et al. | |
| 2003/0018587 A1 | 1/2003 | Althoff et al. | |
| 2003/0028494 A1 | 2/2003 | King et al. | |
| 2003/0035539 A1 | 2/2003 | Thaxton | |
| 2003/0118191 A1 | 6/2003 | Wang et al. | |
| 2003/0156294 A1 | 8/2003 | D'Agraives et al. | |
| 2003/0178487 A1 * | 9/2003 | Rogers | 235/454 |
| 2003/0219145 A1 | 11/2003 | Smith | |
| 2003/0231806 A1 | 12/2003 | Troyanker et al. | |
| 2004/0016810 A1 | 1/2004 | Hori et al. | |
| 2004/0031849 A1 | 2/2004 | Hori et al. | |
| 2004/0059952 A1 | 3/2004 | Newport et al. | |
| 2004/0101158 A1 | 5/2004 | Butler | |
| 2004/0112962 A1 * | 6/2004 | Farrall et al. | 235/462.01 |
| 2004/0155913 A1 | 8/2004 | Kosugi et al. | |
| 2004/0190085 A1 | 9/2004 | Silverbrook et al. | |
| 2004/0199765 A1 | 10/2004 | Kohane et al. | |
| 2005/0044385 A1 | 2/2005 | Holdsworth | |
| 2005/0060171 A1 | 3/2005 | Molnar | |
| 2005/0101841 A9 | 5/2005 | Kaylor et al. | |
| 2005/0108057 A1 | 5/2005 | Cohen et al. | |
| 2005/0122209 A1 | 6/2005 | Black | |
| 2005/0135260 A1 | 6/2005 | Todd | |
| 2005/0178841 A1 | 8/2005 | Jones et al. | |
| 2005/0217969 A1 | 10/2005 | Coombs et al. | |
| 2005/0237534 A1 * | 10/2005 | Deck | 356/497 |
| 2006/0022059 A1 | 2/2006 | Juds | |
| 2006/0104103 A1 | 5/2006 | Colineau | |
| 2006/0163504 A1 | 7/2006 | Fujimoto et al. | |
| 2006/0166381 A1 | 7/2006 | Lange | |
| 2006/0256959 A1 | 11/2006 | Hymes | |
| 2006/0294583 A1 | 12/2006 | Cowburn et al. | |
| 2007/0025619 A1 | 2/2007 | Cowburn et al. | |
| 2007/0027819 A1 | 2/2007 | Cowburn | |
| 2007/0028093 A1 | 2/2007 | Cowburn | |
| 2007/0028107 A1 | 2/2007 | Cowburn et al. | |
| 2007/0028108 A1 | 2/2007 | Cowburn et al. | |
| 2007/0036470 A1 | 2/2007 | Piersol et al. | |
| 2007/0053005 A1 | 3/2007 | Cowburn | |
| 2007/0058037 A1 | 3/2007 | Bergeron et al. | |
| 2007/0113076 A1 | 5/2007 | Cowburn et al. | |
| 2007/0115497 A1 | 5/2007 | Cowburn | |
| 2007/0136612 A1 | 6/2007 | Asano et al. | |
| 2007/0153078 A1 | 7/2007 | Cowburn | |
| 2007/0162961 A1 | 7/2007 | Tarrance et al. | |

| | | | |
|---|---|---|---|
| 2007/0164729 A1 | 7/2007 | Cowburn et al. |
| 2007/0165208 A1 | 7/2007 | Cowburn et al. |
| 2007/0188793 A1 | 8/2007 | Wakai |
| 2007/0192850 A1 | 8/2007 | Cowburn |
| 2007/0199047 A1 | 8/2007 | Gibart et al. |
| 2007/0271456 A1 | 11/2007 | Ward et al. |
| 2008/0002243 A1 | 1/2008 | Cowburn |
| 2008/0016358 A1 | 1/2008 | Filreis et al. |
| 2008/0044096 A1 | 2/2008 | Cowburn |
| 2008/0051033 A1 | 2/2008 | Hymes |
| 2008/0260199 A1 | 10/2008 | Cowburn |
| 2008/0294900 A1 | 11/2008 | Cowburn |
| 2009/0016535 A1 | 1/2009 | Cowburn |
| 2009/0083372 A1 | 3/2009 | Teppler |
| 2009/0283583 A1 | 11/2009 | Cowburn |
| 2009/0290906 A1 | 11/2009 | Cowburn |
| 2009/0303000 A1 | 12/2009 | Cowburn |
| 2009/0307112 A1 | 12/2009 | Cowburn |
| 2010/0007930 A1 | 1/2010 | Cowburn |
| 2010/0008590 A1 | 1/2010 | Cowburn |
| 2010/0141380 A1 | 6/2010 | Pishva |
| 2010/0158377 A1 | 6/2010 | Cowburn |
| 2010/0161529 A1 | 6/2010 | Cowburn |
| 2010/0277446 A1 | 11/2010 | van Veenendaal |

FOREIGN PATENT DOCUMENTS

| | | |
|---|---|---|
| DE | 19632269 | 2/1997 |
| DE | 19612819 | 10/1997 |
| DE | 10155780 | 5/2003 |
| DE | 10234431 | 2/2004 |
| EP | 0234105 | 9/1987 |
| EP | 0278058 | 8/1988 |
| EP | 0334201 | 9/1989 |
| EP | 0472192 | 2/1992 |
| EP | 0480620 | 4/1992 |
| EP | 0570162 | 11/1993 |
| EP | 0590826 | 4/1994 |
| EP | 0691632 | 1/1996 |
| EP | 1087348 | 3/2001 |
| EP | 1273461 | 1/2003 |
| EP | 1286315 | 2/2003 |
| EP | 1388797 | 2/2004 |
| EP | 1418542 | 5/2004 |
| EP | 1434161 | 6/2004 |
| EP | 1507227 | 2/2005 |
| EP | 1577812 | 9/2005 |
| EP | 1587030 | 10/2005 |
| EP | 1616711 | 12/2005 |
| EP | 1990779 | 11/2008 |
| GB | 1319928 | 3/1972 |
| GB | 1458726 | 12/1976 |
| GB | 2097979 | 11/1982 |
| GB | 2221870 | 2/1990 |
| GB | 2228821 | 9/1990 |
| GB | 2304077 | 12/1997 |
| GB | 2346110 | 1/2000 |
| GB | 2346111 | 1/2000 |
| GB | 2411954 | 9/2005 |
| GB | 2417074 | 2/2006 |
| GB | 2417592 | 3/2006 |
| GB | 2417707 | 3/2006 |
| GB | 2426100 | 11/2006 |
| GB | 2428846 | 2/2007 |
| GB | 2428948 | 2/2007 |
| GB | 2429092 | 2/2007 |
| GB | 2429097 | 2/2007 |
| GB | 2431759 | 5/2007 |
| GB | 2433632 | 6/2007 |
| GB | 2434642 | 8/2007 |
| GB | 2462059 | 7/2008 |
| JP | H02-10482 | 1/1990 |
| JP | H03192523 | 8/1991 |
| JP | H06301840 | 10/1994 |
| JP | 07210721 | 8/1995 |
| JP | H08-003548 | 1/1996 |
| JP | H08180189 | 7/1996 |
| JP | 09218910 | 8/1997 |
| JP | H11-224319 | 8/1999 |
| JP | 2000140987 | 5/2000 |
| JP | 2002092682 | 3/2002 |
| JP | 2004/102562 | 4/2002 |
| JP | 2003-150585 | 5/2003 |
| JP | 2003141595 | 5/2003 |
| JP | 2004171109 | 6/2004 |
| JP | 2005217805 | 8/2005 |
| JP | 2008523438 | 7/2010 |
| KR | 20050023050 | 3/2005 |
| NL | 8002604 | 12/1981 |
| NL | 9401796 C | 10/1994 |
| RU | 2043201 | 9/1995 |
| RU | 2065819 | 8/1996 |
| WO | 89/00742 | 1/1989 |
| WO | 91/11703 | 8/1991 |
| WO | 91/19614 | 12/1991 |
| WO | 93/22745 | 11/1993 |
| WO | WO 95/24691 | 9/1995 |
| WO | 95/34018 | 12/1995 |
| WO | 96/36934 | 11/1996 |
| WO | 97/24699 | 7/1997 |
| WO | 99/13391 | 3/1999 |
| WO | 00/45344 | 8/2000 |
| WO | 2000/46980 | 8/2000 |
| WO | 00/65541 | 11/2000 |
| WO | 01/18754 | 3/2001 |
| WO | 01/25024 | 4/2001 |
| WO | 01/43086 | 6/2001 |
| WO | 01/86574 | 11/2001 |
| WO | 01/86589 | 11/2001 |
| WO | 01/91007 | 11/2001 |
| WO | 02/50790 | 6/2002 |
| WO | 03/087991 | 10/2003 |
| WO | 2004/025548 | 3/2004 |
| WO | 2004/025549 | 3/2004 |
| WO | 2004/057525 | 7/2004 |
| WO | 2004/070667 | 8/2004 |
| WO | 2004/109479 | 12/2004 |
| WO | 2005/04039 | 1/2005 |
| WO | 2005/004797 | 1/2005 |
| WO | 2005/027032 | 3/2005 |
| WO | 2005/029447 | 3/2005 |
| WO | 2005/088517 | 3/2005 |
| WO | 2005027032 | 3/2005 |
| WO | 20051029447 | 3/2005 |
| WO | 2005/048256 | 5/2005 |
| WO | 2005/078651 | 8/2005 |
| WO | 2005/080088 | 9/2005 |
| WO | 2005/086158 | 9/2005 |
| WO | 2005/088533 | 9/2005 |
| WO | 2005/122100 | 12/2005 |
| WO | 02/016112 | 2/2006 |
| WO | 02/016114 | 2/2006 |
| WO | 2006/016112 | 2/2006 |
| WO | 2006/016114 | 2/2006 |
| WO | 2006/021083 | 3/2006 |
| WO | 2006/132584 | 12/2006 |
| WO | 2007/012815 | 2/2007 |
| WO | 2007/012821 | 2/2007 |
| WO | 2007/028799 | 3/2007 |
| WO | 2007/072048 | 6/2007 |
| WO | 2007/080375 | 7/2007 |
| WO | 2007/111548 | 10/2007 |
| WO | 2007/144598 | 12/2007 |
| WO | 2009/141576 | 11/2009 |
| WO | 2010/004281 | 1/2010 |
| WO | 2010/004282 | 1/2010 |
| WO | 2004/097826 | 4/2010 |

OTHER PUBLICATIONS

Ravikanth, Pappu Srinivasa. "Physical One-Way Functions," Mar. 2001.

Zhang D et al., "Shape-based image retrieval using generic Fourier descriptor," Signal Processing. Image Communication, Ellsevier Science Publishers, Amsterdam, NL 17(10):825-848 (Nov. 2002).

Derrode S et al., "Robust and Efficient Fourier-Mellin Transform Approximations for Gray-Level Image Reconstruction and Complete Invariant Description," Computer Vision and Image Understanding, Academic Press, San Diego, CA, 83(1):57-78 (Jul. 2001).

Anderson, R., "Security Engineering: a guide to building dependable distributed systems," Wiley, 251-253, 2001.

Kravolec, "Plastic tag makes foolproof ID," Technology Research News, Oct. 2, 2002.

Smalley, Eric, "Plastic Tag makes foolproof ID," Technology Research News, Oct. 2, 2002.

Chen, Yuqun et al., "Certifying Authenticity via Fiber-Infused Paper," ACM SIG ecom Exchanges, 5(3):29-37 (2005).

Kirovski, Darko, "Toward an Automated Verification of Certificates of Authenticity," pp. 160-169 (2004).

G.J. Simmons, A survey of information authentication, in <i>Contemporary Cryptology, The Science of Information Integrity</i>, pp. 379-419 IEEE Press (1992).

Zwick/Roell—Zwick Materials testing—the new direction in extension measurement—optiXtens.

International Search Report from International App. No. PCT/GB2005/000922 filed Mar. 9, 2005.

Buchanan, James, "Fingerprinting Documents and Packaging," Nature, 436:475 (2005).

International Search Report for Great Britain Patent App. No. GB0607867.0 (Aug. 2006).

Haist et al., "Optical detection of random features for high security applications," Optics Communications, 147:173-179 (1998).

Pappu et al., "Physical one-way functions," Science, American Association for the Advancement of Science, vol. 297, No. 5589, pp. 2026-2030 (2002).

Cowburn, Russell, "Nanotechnology-Security and Brand Protection Applications 01," Smart Brand and Product Protection Conference 2005, Apr. 8, 2005 to Apr. 9, 2005, pp. 1-4, London, UK.

Van Renesse R.L, "Optical inspection techniques for security instrumentation," Proceedings of SPIE-The International Society for Optical Engineering, Vo. 2659, pp. 159-167 (Mar. 1996).

Anonymous, "Discs and paper get biometric identifiers," IEEE Review, vol. 50, No. 12, p. 23, (Dec. 2004).

Wilkes, Sally, "Fighting Fraud: Document Biometrics," Materials World, vol. 12, No. 12, pp. 29-30 (Dec. 2004).

Smith et al., "Microstructure Based Indicia," Laboratories Escher Group, pp. 1-5 (1999).

Schneier B., "Applied Cryptography. Protocols, Algorithms, and Source Code in C, Passage," Applied Cryptography, 2nd Ed., John Wiley & Sons, Inc., New York, p. 197 (1996).

El-Khamy S. E. et al., "The FBG stream cipher," Proceedings of the 24th Radio National Science Conference (NRSC 2007) IEEE Cairo, Egypt, pp. 1-8 (Mar. 2007).

Hao F. et al., "Combining crypto with biometrics effectively," IEEE Transactions on Computers IEEE USA, 55 (9):1081-1088 (Sep. 2006).

International Search Report and Written Opinion for PCT/GB2008/002020 dated Jun. 16, 2009.

International Search Report for Great Britain Patent Application No. GB0711461.4 dated Sep. 21, 2007.

Written Opinion for PCT/GB2007/000015 dated May 4, 2007.

International Search Report for PCT/GB2009/001702 dated Oct. 23, 2009.

UK Search Report for GB0812772.2 dated Nov. 6, 2008.

UK Search Report for GB0812773 dated Mar. 2009.

UK Search Report for GB0812773 dated Nov. 2008.

International Search Report for PCT/GB2007/002173 dated Sep. 19, 2007.

Huss G. et al., "Spatial filtering efficiency of single-mode optical fibers for stellar interferometry applications: phenomenological and numerical study," Optics Communications, North-Holland Publishing Co., Amsterdam, NL, 244:209-217 (Sep. 23, 2004).

Kvasnik et al., "Image recognition using surface scattered light in a coherent optical processor," Image Processing and its Applications, University of Manchester Institute of Science and Technology UK, pp. 361-364 (1992).

d'Agraives et al., "Surface Topography, A Remarkable Method for the Identification of Seals of Structures in General," Commission of the European Communities Joint Research Centre—Ispra Establishment 1-21020 Ispra (Va), Italy, pp. 403-409 (1981).

* cited by examiner

VERIFICATION OF AUTHENTICITY

This application claims priority to and incorporates by reference U.S. provisional application No. 60/702,732 filed on Jul. 27, 2005, and Great Britain patent application GB 0515460.4 filed on Jul. 27, 2005.

FIELD

The present invention relates to verification of authenticity, and in particular but not exclusively to more especially verification of authenticity of an article such as an personal identification (ID) card, vendable product, important document or other item.

Many traditional authentication security systems rely on a process which is difficult for anybody other than the manufacturer to perform, where the difficulty may be imposed by expense of capital equipment, complexity of technical know-how or preferably both. Examples are the provision of a watermark in bank notes and a hologram on credit cards or passports. Unfortunately, criminals are becoming more sophisticated and can reproduce virtually anything that original manufacturers can do.

Because of this, there is a known approach to authentication security systems which relies on creating security tokens using some process governed by laws of nature which results in each token being unique, and more importantly having a unique characteristic that is measurable and can thus be used as a basis for subsequent verification. According to this approach tokens are manufactured and measured in a set way to obtain a unique characteristic. The characteristic can then be stored in a computer database, or otherwise retained. Tokens of this type can be embedded in the carrier article, e.g. a banknote, passport, ID card, important document. Subsequently, the carrier article can be measured again and the measured characteristic compared with the characteristics stored in the database to establish if there is a match.

Security tokens can be used to access information, authorise transactions or many other purposes. However, damaged tokens and imperfect token identification apparatuses can lead to difficulties in carrying out the activities to which the token should provide enablement.

SUMMARY

The present invention has been made, at least in part, in consideration of problems and drawbacks of conventional systems.

The present invention has at least in part resulted from the inventor's work on applying authentication techniques using tokens made of magnetic materials, where the uniqueness is provided by unreproducible defects in the magnetic material that affect the token's magnetic response (as detailed in PCT/GB03/03917, Cowburn). As part of this work, magnetic materials were fabricated in barcode format, i.e. as a number of parallel strips. As well as reading the unique magnetic response of the strips by sweeping a magnetic field with a magnetic reader, an optical scanner was built to read the barcodes by scanning a laser beam over the barcode and using contrast from the varying reflectivity of the barcode strips and the article on which they were formed. This information was complementary to the magnetic characteristic, since the barcode was being used to encode a digital signature of the unique magnetic response in a type of well known self authentication scheme, for example as also described above for banknotes (see for example, Kravolec "Plastic tag makes foolproof ID", Technology research news, 2 Oct. 2002).

To the surprise of the inventor, it was discovered when using this optical scanner that the paper background material on which the magnetic chips were supported gave a unique optical response to the scanner. On further investigation, it was established that many other unprepared surfaces, such as surfaces of various types of cardboard and plastic, show the same effect. Moreover, it has been established by the inventor that the unique characteristic arises at least in part from speckle, but also includes non-speckle contributions.

It has thus been discovered that it is possible to gain all the advantages of speckle based techniques without having to use a specially prepared token or specially prepare an article in any other way. In particular, many types of paper, cardboard and plastics have been found to give unique characteristic scattering signals from a coherent light beam, so that unique digital signatures can be obtained from almost any paper document or cardboard packaging item.

The above-described known speckle readers used for security devices appear to be based on illuminating the whole of a token with a laser beam and imaging a significant solid angle portion of the resultant speckle pattern with a CCD (see for example GB 2 221 870 and U.S. Pat. No. 6,584,214), thereby obtaining a speckle pattern image of the token made up of a large array of data points.

The reader used by the inventor does not operate in this manner. It uses four single channel detectors (four simple phototransistors) which are angularly spaced apart to collect only four signal components from the scattered laser beam. The laser beam is focused to a spot covering only a very small part of the surface. Signal is collected from different localised areas on the surface by the four single channel detectors as the spot is scanned over the surface. The characteristic response from the article is thus made up of independent measurements from a large number (typically hundreds or thousands) of different localised areas on the article surface. Although four phototransistors are used, analysis using only data from a single one of the phototransistors shows that a unique characteristic response can be derived from this single channel alone! However, higher security levels are obtained if further ones of the four channels are included in the response.

Viewed from a first aspect, the present invention provides an article identification method. The method can comprise: determining a signature from an article based upon an intrinsic characteristic of the article; and comparing the determined signature to a stored signature. The method can also comprise splitting the determined signature into blocks of contiguous data, and performing a comparison operation between each block and respective blocks of the stored signature. Thus a higher level of granularity in verifying the article can be achieved.

In some embodiments the method can also comprise comparing an attribute of a comparison result from each block comparison to an expected attribute of the block comparison to determine a compensation value for use in determining a comparison result. The method can also comprise determining a similarity result between the determined signature and the stored signature, using the compensation value to adjust the determined signature. Thus an article damaged by stretching or shrinking can be successfully identified. Also, a non-linear signature determination can be accommodated without losing identification accuracy. Thus a variety of physical alignment deviations during a signature generation step can be compensated for to allow a correct comparison result to be achieved.

In some embodiments determining the signature comprises: exposing the value entitlement token to coherent radiation; collecting a set of data points that measure scatter of the coherent radiation from intrinsic structure of the value entitlement token; and determining a signature of the value entitlement token from the set of data points. Thus the intrinsic characteristic can be a surface pattern of a material from which an article is made.

In some embodiments the comparing of an attribute of a comparison result from each block comparison to an expected attribute of the block comparison comprises comparing an actual cross-correlation peak location of a comparison result between a block of the determined signature and the corresponding block of the stored signature to an expected cross correlation peak location to determine the compensation value for use in determining a comparison result. Thus the expected result can be used to work out physical alignment deviations of the article during scanning.

In some embodiments the determining of the compensation value comprises estimating a function of best fit to the cross-correlation peak locations for each of the block comparisons, the function of best fit representing an average deviation from the expected cross-correlation peak locations. Thus an average deviation from the expected position can be used for the compensation. The average deviation may be measured in many ways, and may result in a function of best fit which is one of a variety of functions, which can include a straight line function, an exponential function, a trigonometric function and an $x^2$ function.

In some embodiments, the method further comprises comparing the determined signature to a plurality stored signatures. A closest match result between the determined signature and the plurality of stored signatures can be found. Also, a no-match result can be found if the determined signature has determined therefor a similarity result lower than a predetermined threshold for each of the stored signatures. Thus an item can be compared to a database of item signatures to determine whether that item is a member of that database. This can be used to determine the authenticity of a variety of articles, such as products, value transfer tokens, value transfer authorisation tokens, entitlement tokens and access tokens.

In some embodiments, the method can also comprise calculating a similarity result for each compared block. In some embodiments the method can also comprise is comparing the similarity result for at least one predetermined block to a predetermined similarity threshold and returning a negative comparison result in the event of the similarity result for the at least one predetermined block being below a predetermined similarity threshold, regardless of a similarity result for the signatures as a whole. Thus a critical portion of an article can be identified and a positive match be required for authenticity verification of the article for the critical portion as well as the signature as a whole.

Viewed from a second aspect, the present invention provides a system for identifying an article. The system can comprise a signature determination unit operable to determine a signature from an article based upon an intrinsic characteristic of the article and a comparison unit operable to compare the determined signature to a stored signature. The comparison unit can be operable to split the determined signature into blocks of contiguous data and to perform a comparison operation between each block and respective blocks of the stored signature. Thus a high granularity analysis of the article signature can be performed.

In some embodiments, the comparison unit can be further operable to compare an attribute of a comparison result from each block comparison to an expected attribute of block the comparison to determine a compensation value for use in determining a comparison result. The comparison unit can be further operable to determine a similarity result between the determined signature and the stored signature, using the compensation value to adjust the determined signature. Thus an article damaged by stretching or shrinking can be successfully identified. Also, a non-linear signature determination can be accommodated without losing identification accuracy. Thus a variety of physical alignment deviations during a signature generation step can be compensated for to allow a correct comparison result to be achieved.

In some embodiments, the comparison unit can be operable to calculate a similarity result for each compared block. The comparison unit can also be operable to compare the similarity result for at least one predetermined block to a predetermined similarity threshold and to return a negative comparison result in the event of the similarity result for the at least one predetermined block being below a predetermined similarity threshold, regardless of a similarity result for the signatures as a whole. Thus a critical part of an article can be identified and subjected to a higher level of scrutiny than other areas of an article.

In some embodiments, it is ensured that different ones of the data gathered in relation to the intrinsic property of the article relate to scatter from different parts of the article by providing for movement of the coherent beam relative to the article. The movement may be provided by a motor that moves the beam over an article that is held fixed. The motor could be a servo motor, free running motor, stepper motor or any suitable motor type. Alternatively, the drive could be manual in a low cost reader. For example, the operator could scan the beam over the article by moving a carriage on which the article is mounted across a static beam. The coherent beam cross-section will usually be at least one order of magnitude (preferably at least two) smaller than the projection of the article so that a significant number of independent data points can be collected. A focusing arrangement may be provided for bringing the coherent beam into focus in the article. The focusing arrangement may be configured to bring the coherent beam to an elongate focus, in which case the drive is preferably configured to move the coherent beam over the article in a direction transverse to the major axis of the elongate focus. An elongate focus can conveniently be provided with a cylindrical lens, or equivalent mirror arrangement.

In other embodiments, it can be ensured that different ones of the data points relate to scatter from different parts of the article, in that the detector arrangement includes a plurality of detector channels arranged and configured to sense scatter from respective different parts of the article. This can be achieved with directional detectors, local collection of signal with optical fibres or other measures. With directional detectors or other localised collection of signal, the coherent beam does not need to be focused. Indeed, the coherent beam could be static and illuminate the whole sampling volume. Directional detectors could be implemented by focusing lenses fused to, or otherwise fixed in relation to, the detector elements. Optical fibres may be used in conjunction with microlenses.

It is possible to make a workable reader when the detector arrangement consists of only a single detector channel. Other embodiments use a detector arrangement that comprises a group of detector elements angularly distributed and operable to collect a group of data points for each different part of the reading volume, preferably a small group of a few detector elements. Security enhancement is provided when the signature incorporates a contribution from a comparison between data points of the same group. This comparison may conveniently involve a cross-correlation.

Although a working reader can be made with only one detector channel, there are preferably at least 2 channels. This allows cross-correlations between the detector signals to be made, which is useful for the signal processing associated with determining the signature. It is envisaged that between 2 and 10 detector channels will be suitable for most applications with 2 to 4 currently being considered as the optimum balance between apparatus simplicity and security.

The detector elements are advantageously arranged to lie in a plane intersecting the reading volume with each member of the pair being angularly distributed in the plane in relation to the coherent beam axis, preferably with one or more detector elements either side of the beam axis. However, non-planar detector arrangements are also acceptable.

The use of cross-correlations of the signals obtained from the different detectors has been found to give valuable data for increasing the security levels and also for allowing the signatures to be more reliably reproducible over time. The utility of the cross-correlations is somewhat surprising from a scientific point of view, since speckle patterns are inherently uncorrelated (with the exception of signals from opposed points in the pattern). In other words, for a speckle pattern there will by definition be zero cross-correlation between the signals from the different detectors so long as they are not arranged at equal magnitude angles offset from the excitation location in a common plane intersecting the excitation location. The value of using cross-correlation contributions therefore indicates that an important part of the scatter signal is not speckle. The non-speckle contribution could be viewed as being the result of direct scatter, or a diffuse scattering contribution, from a complex surface, such as paper fibre twists. At present the relative importance of the speckle and non-speckle scatter signal contribution is not clear. However, it is clear from the experiments performed to date that the detectors are not measuring a pure speckle pattern, but a composite signal with speckle and non-speckle components.

Incorporating a cross-correlation component in the signature can also be of benefit for improving security. This is because, even if it is possible using high resolution printing to make an article that reproduces the contrast variations over the surface of the genuine article, this would not be able to match the cross-correlation coefficients obtained by scanning the genuine article.

In the one embodiment, the detector channels are made up of discrete detector components in the form of simple phototransistors. Other simple discrete components could be used such as PIN diodes or photodiodes. Integrated detector components, such as a detector array could also be used, although this would add to the cost and complexity of the device.

From initial experiments which modify the illumination angle of the laser beam on the article to be scanned, it also seems to be preferable in practice that the laser beam is incident approximately normal to the surface being scanned in order to obtain a characteristic that can be repeatedly measured from the same surface with little change, even when the article is degraded between measurements. At least some known readers use oblique incidence (see GB 2 221 870). Once appreciated, this effect seems obvious, but it is clearly not immediately apparent as evidenced by the design of some prior art speckle readers including that of GB 2 221 870 and indeed the first prototype reader built by the inventor. The inventor's first prototype reader with oblique incidence functioned reasonably well in laboratory conditions, but was quite sensitive to degradation of the paper used as the article. For example, rubbing the paper with fingers was sufficient to cause significant differences to appear upon re-measurement. The second prototype reader used normal incidence and has been found to be robust against degradation of paper by routine handling, and also more severe events such as: passing through various types of printer including a laser printer, passing through a photocopier machine, writing on, printing on, deliberate scorching in an oven, and crushing and reflattening.

It can therefore be advantageous to mount the source so as to direct the coherent beam onto the reading volume so that it will strike an article with near normal incidence. By near normal incidence means ±5, 10 or 20 degrees. Alternatively, the beam can be directed to have oblique incidence on the articles. This will usually have a negative influence in the case that the beam is scanned over the article.

It is also noted that in the readers described in the detailed description, the detector arrangement is arranged in reflection to detect radiation back scattered from the reading volume. However, if the article is transparent, the detectors could be arranged in transmission.

A signature generator can be operable to access the database of previously recorded signatures and perform a comparison to establish whether the database contains a match to the signature of an article that has been placed in the reading volume. The database may be part of a mass storage device that forms part of the reader apparatus, or may be at a remote location and accessed by the reader through a telecommunications link. The telecommunications link may take any conventional form, including wireless and fixed links, and may be available over the internet. The data acquisition and processing module may be operable, at least in some operational modes, to allow the signature to be added to the database if no match is found.

When using a database, in addition to storing the signature it may also be useful to associate that signature in the database with other information about the article such as a scanned copy of the document, a photograph of a passport holder, details on the place and time of manufacture of the product, or details on the intended sales destination of vendable goods (e.g. to track grey importation).

The invention allows identification of articles made of a variety of different kinds of materials, such as paper, cardboard and plastic.

By intrinsic structure we mean structure that the article inherently will have by virtue of its manufacture, thereby distinguishing over structure specifically provided for security purposes, such as structure given by tokens or artificial fibres incorporated in the article.

By paper or cardboard we mean any article made from wood pulp or equivalent fibre process. The paper or cardboard may be treated with coatings or impregnations or covered with transparent material, such as cellophane. If long-term stability of the surface is a particular concern, the paper may be treated with an acrylic spray-on transparent coating, for example.

Data points can thus be collected as a function of position of illumination by the coherent beam. This can be achieved either by scanning a localised coherent beam over the article, or by using directional detectors to collect scattered light from different parts of the article, or by a combination of both.

The signature is envisaged to be a digital signature in most applications. Typical sizes of the digital signature with current technology would be in the range 200 bits to 8 k bits, where currently it is preferable to have a digital signature size of about 2 k bits for high security.

A further implementation of the invention can be performed without storing the digital signatures in a database, but rather by labelling the entitlement token with a label derived from the signature, wherein the label conforms to a machine-readable encoding protocol.

BRIEF DESCRIPTION OF THE FIGURES

Specific embodiments of the present invention will now be described by way of example only with reference to the accompanying figures in which.

Figure 1:
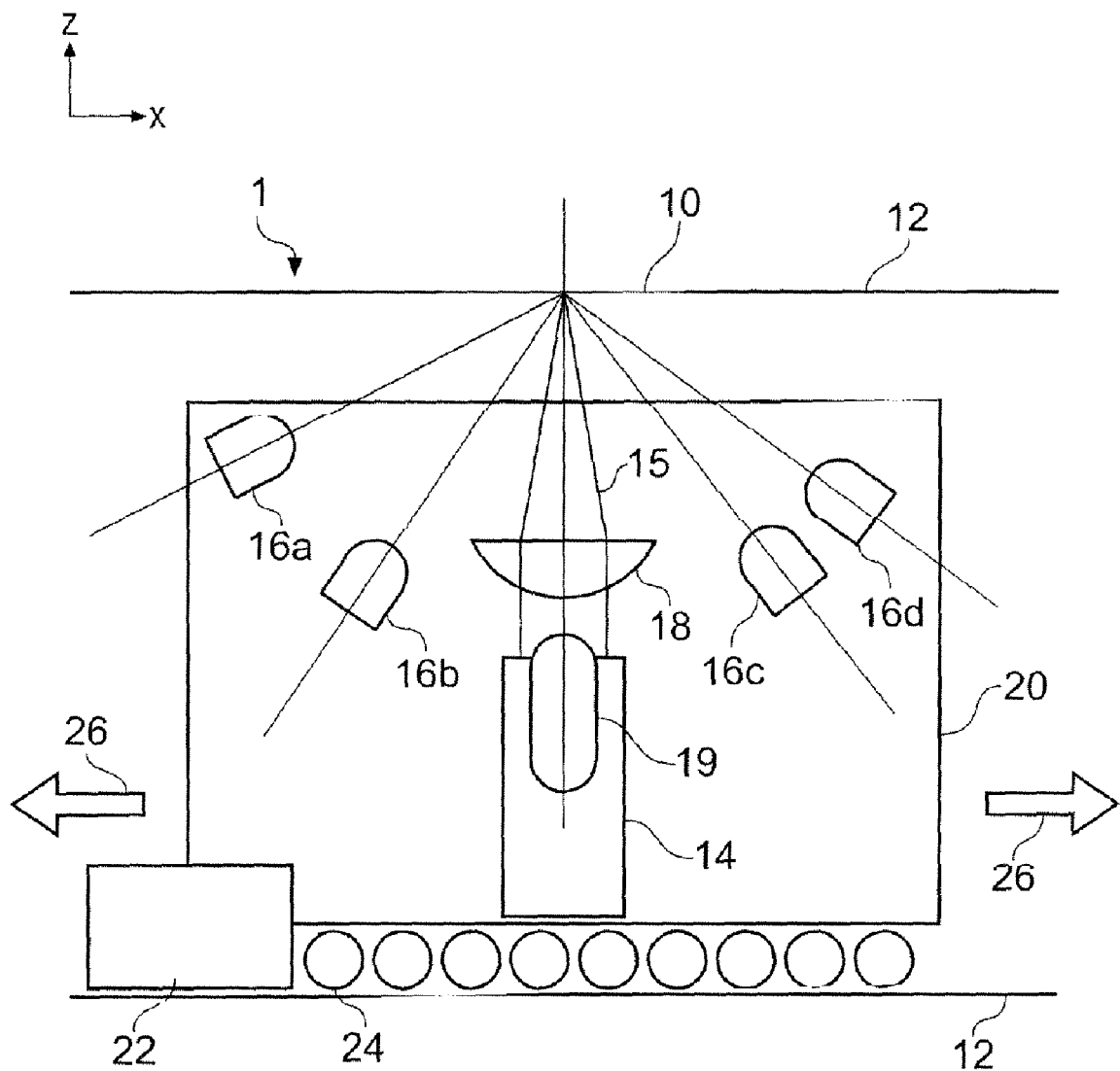
FIG. 1 is a schematic side view of an example of a reader apparatus.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the scope of the present invention as defined by the appended claims.

DESCRIPTION OF PARTICULAR EMBODIMENTS

For providing security and authorisation services in environments such as an e-commerce environment, a system for uniquely identifying a physical item can be used to reduce possibilities for fraud, and to enhance both actual and perceived reliability of the e-commerce system, for both provider and end-users.

Examples of systems suitable for performing such item identification will now be described with reference to FIGS. 1 to 11.

FIG. 1 shows a schematic side view of a first example of a reader apparatus 1. The optical reader apparatus 1 is for measuring a signature from an article (not shown) arranged in a reading volume of the apparatus. The reading volume is formed by a reading aperture 10 which is a slit in a housing 12. The housing 12 contains the main optical components of the apparatus. The slit has its major extent in the x direction (see inset axes in the drawing). The principal optical components are a laser source 14 for generating a coherent laser beam 15 and a detector arrangement 16 made up of a plurality of k photodetector elements, where k=4 in this example, labelled 16*a*, 16*b*, 16*c* and 16*d*. The laser beam 15 is focused by a cylindrical lens 18 into an elongate focus extending in the y direction (perpendicular to the plane of the drawing) and lying in the plane of the reading aperture. In one example reader, the elongate focus has a major axis dimension of about 2 mm and a minor axis dimension of about 40 micrometers. These optical components are contained in a subassembly 20. In the present example, the four detector elements 16*a* . . . *d* are distributed either side of the beam axis offset at different angles in an interdigitated arrangement from the beam axis to collect light scattered in reflection from an article present in the reading volume. In the present example, the offset angles are −70, −20, +30 and +50 degrees. The angles either side of the beam axis are chosen so as not to be equal so that the data points they collect are as independent as possible. All four detector elements are arranged in a common plane. The photodetector elements 16*a*.*d* detect light scattered from an article placed on the housing when the coherent beam scatters from the reading volume. As illustrated, the source is mounted to direct the laser beam 15 with its beam axis in the z direction, so that it will strike an article in the reading aperture at normal incidence.

Generally it is desirable that the depth of focus is large, so that any differences in the article positioning in the z direction do not result in significant changes in the size of the beam in the plane of the reading aperture. In the present example, the depth of focus is approximately 0.5 mm which is sufficiently large to produce good results where the position of the article relative to the scanner can be controlled to some extent. The parameters, of depth of focus, numerical aperture and working distance are interdependent, resulting in a well known trade off between spot size and depth of focus.

A drive motor 22 is arranged in the housing 12 for providing linear motion of the optics subassembly 20 via suitable bearings 24 or other means, as indicated by the arrows 26. The drive motor 22 thus serves to move the coherent beam linearly in the x direction over the reading aperture 10 so that the beam 15 is scanned in a direction transverse to the major axis of the elongate focus. Since the coherent beam 15 is dimensioned at its focus to have a cross-section in the xz plane (plane of the drawing) that is much smaller than a projection of the reading volume in a plane normal to the coherent beam, i.e. in the plane of the housing wall in which the reading aperture is set, a scan of the drive motor 22 will cause the coherent beam 15 to sample many different parts of the reading volume under action of the drive motor 22.

Figure 2:
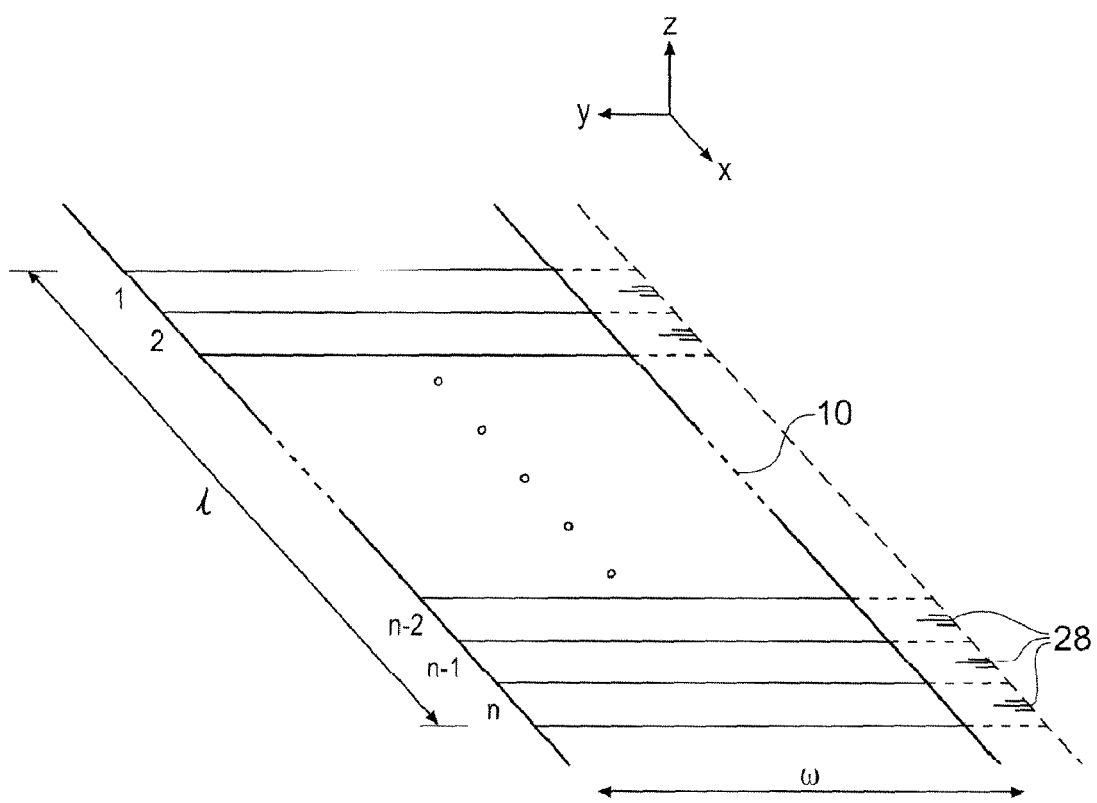
FIG. 2 is a schematic perspective view showing how the reading volume of the reader apparatus of FIG. 1 is sampled.

FIG. 2 is included to illustrate this sampling and is a schematic perspective view showing how the reading area is sampled n times by scanning an elongate beam across it. The sampling positions of the focused laser beam as it is scanned along the reading aperture under action of the drive is represented by the adjacent rectangles numbered 1 to n which sample an area of length 'l' and width 'w'. Data collection is made so as to collect signal at each of the n positions as the drive is scanned along the slit. Consequently, a sequence of k×n data points are collected that relate to scatter from the n different illustrated parts of the reading volume.

Also illustrated schematically are optional distance marks 28 formed on the underside of the housing 12 adjacent the slit 10 along the x direction, i.e. the scan direction. An example spacing between the marks in the x-direction is 300 micrometres. These marks are sampled by a tail of the elongate focus and provide for linearisation of the data in the x direction in situations where such linearisation is required, as is described in more detail further below. The measurement is performed by an additional phototransistor 19 which is a directional detector arranged to collect light from the area of the marks 28 adjacent the slit.

In alternative examples, the marks 28 can be read by a dedicated encoder emitter/detector module 19 that is part of the optics subassembly 20. Encoder emitter/detector modules are used in bar code readers. In one example, an Agilent HEDS-1500 module that is based on a focused light emitting diode (LED) and photodetector can be used. The module signal is fed into the PIC ADC as an extra detector channel (see discussion of FIG. 3 below).

With an example minor dimension of the focus of 40 micrometers, and a scan length in the x direction of 2 cm, n=500, giving 2000 data points with k=4. A typical range of values for k×n depending on desired security level, article type, number of detector channels 'k' and other factors is expected to be 100<k×n<10,000. It has also been found that increasing the number of detectors k also improves the insensitivity of the measurements to surface degradation of the article through handling, printing etc. In practice, with the prototypes used to date, a rule of thumb is that the total number of independent data points, i.e. k×n, should be 500 or more to give an acceptably high security level with a wide variety of surfaces. Other minima (either higher or lower) may apply where a scanner is intended for use with only one specific surface type or group of surface types.

Figure 3:
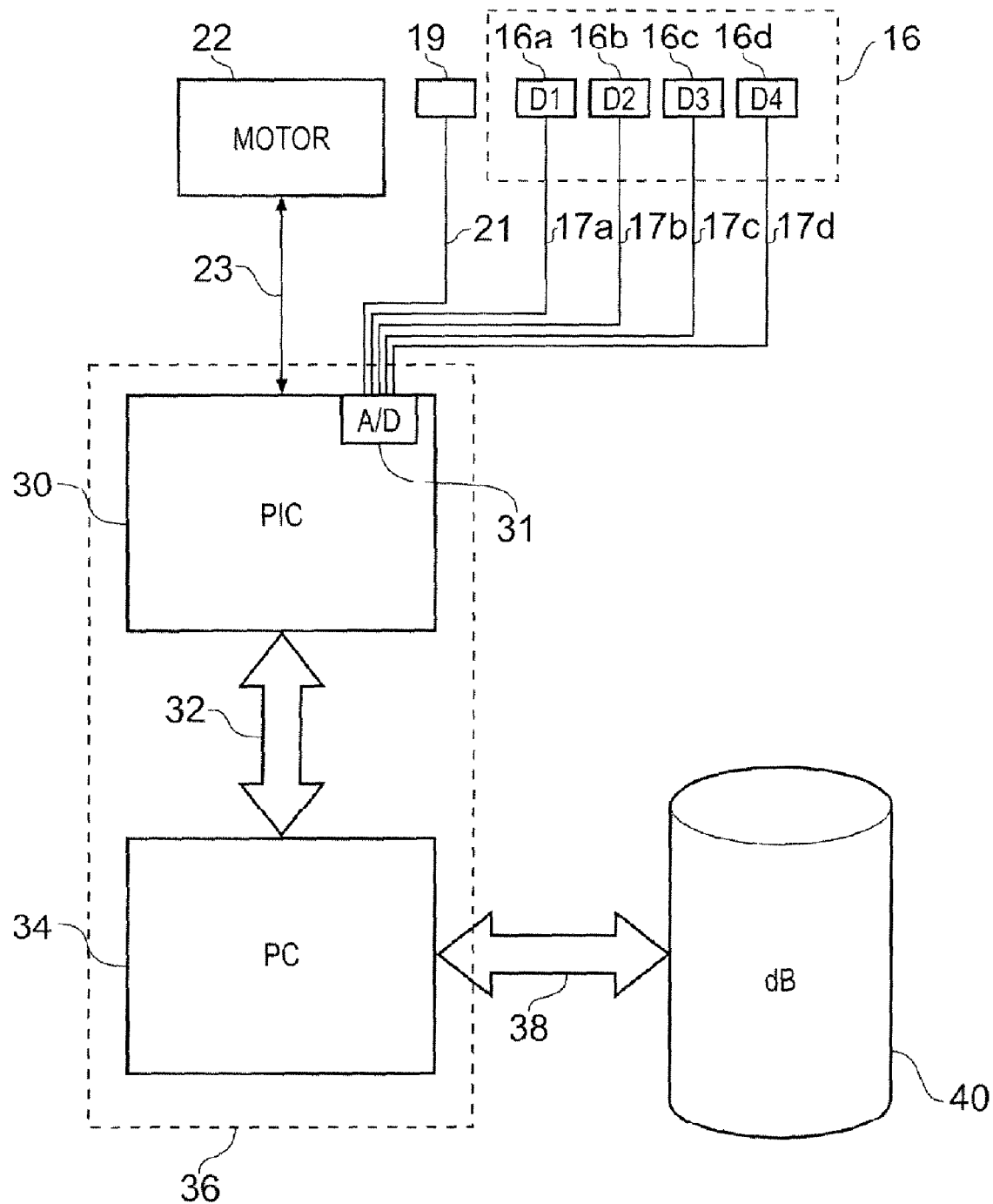
FIG. 3 is a block schematic diagram of the functional components of the reader apparatus of FIG. 1.

FIG. 3 is a block schematic diagram of functional components of the reader apparatus. The motor 22 is connected to a programmable interrupt controller (PIC) 30 through an electrical link 23. The detectors 16a . . . d of the detector module 16 are connected through respective electrical connection lines 17a . . . d to an analogue-to-digital converter (ADC) that is part of the PIC 30. A similar electrical connection line 21 connects the marker reading detector 19 to the PIC 30. It will be understood that optical or wireless links may be used instead of, or in combination with, electrical links. The PIC 30 is interfaced with a personal computer (PC) 34 through a data connection 32. The PC 34 may be a desktop or a laptop. As an alternative to a PC, other intelligent devices may be used, for example a personal digital assistant (PDA) or a dedicated electronics unit. The PIC 30 and PC 34 collectively form a data acquisition and processing module 36 for determining a signature of the article from the set of data points collected by the detectors 16a . . . d.

In some examples, the PC 34 can have access through an interface connection 38 to a database (dB) 40. The database 40 may be resident on the PC 34 in memory, or stored on a drive thereof. Alternatively, the database 40 may be remote from the PC 34 and accessed by wireless communication, for example using mobile telephony services or a wireless local area network (LAN) in combination with the internet Moreover, the database 40 may be stored locally on the PC 34, but periodically downloaded from a remote source. The database may be administered by a remote entity, which entity may provide access to only a part of the total database to the particular PC 34, and/or may limit access the database on the basis of a security policy.

The database 40 can contain a library of previously recorded signatures. The PC 34 can be programmed so that in use it can access the database 40 and performs a comparison to establish whether the database 40 contains a match to the signature of the article that has been placed in the reading volume. The PC 34 can also be programmed to allow a signature to be added to the database if no match is found.

The way in which data flow between the PC and database is handled can be dependent upon the location of the PC and the relationship between the operator of the PC and the operator of the database. For example, if the PC and reader are being used to confirm the authenticity of an article, then the PC will not need to be able to add new articles to the database, and may in fact not directly access the database, but instead provide the signature to the database for comparison. In this arrangement the database may provide an authenticity result to the PC to indicate whether the article is authentic. On the other hand, if the PC and reader are being used to record or validate an item within the database, then the signature can be provided to the database for storage therein, and no comparison may be needed. In this situation a comparison could be performed however, to avoid a single item being entered into the database twice.

Figure 4:
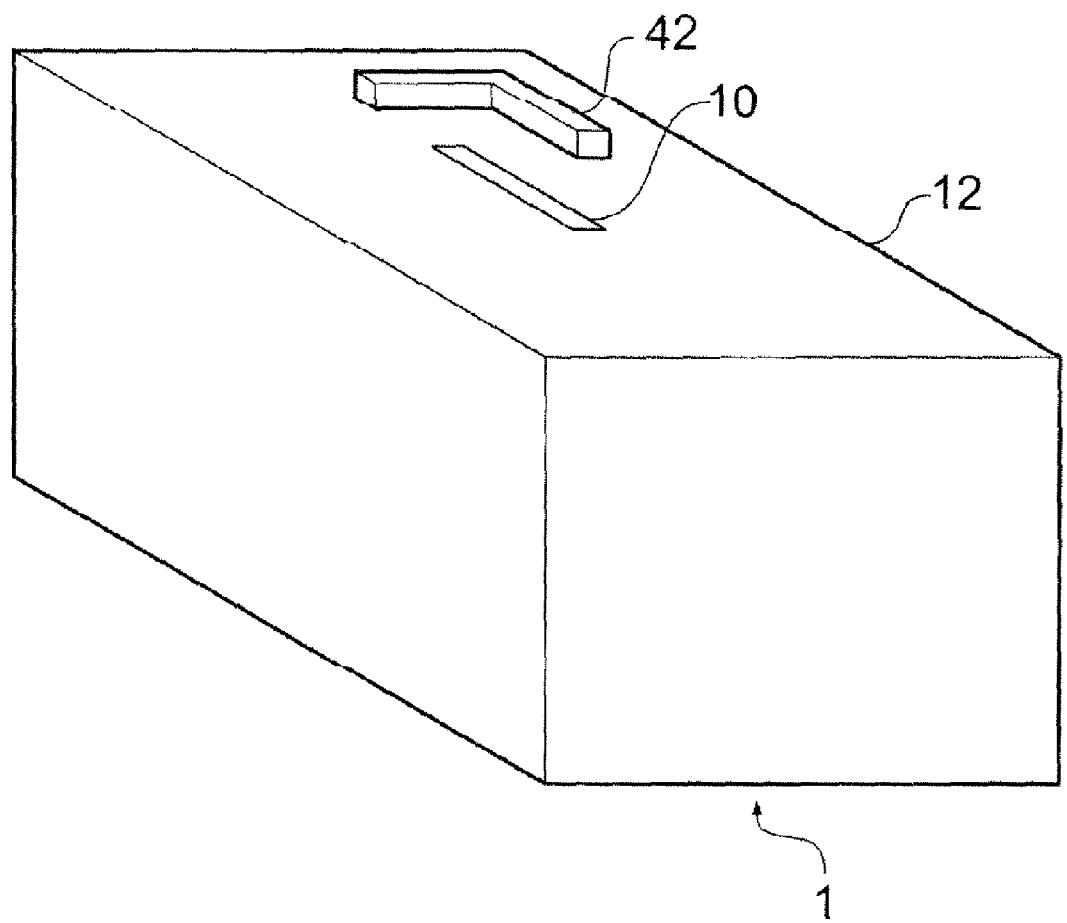
FIG. 4 is a perspective view of the reader apparatus of FIG. 1 showing its external form.

FIG. 4 is a perspective view of the reader apparatus 1 showing its external form. The housing 12 and slit-shaped reading aperture 10 are evident. A physical location aid 42 is also apparent and is provided for positioning an article of a given form in a fixed position in relation to the reading aperture 10. In the present example, the physical location aid 42 is in the form of a right-angle bracket in which the corner of a document or packaging box can be located. This ensures that the same part of the article can be positioned in the reading aperture 10 whenever the article needs to be scanned. A simple angle bracket or equivalent, is sufficient for articles with a well-defined corner, such as sheets of paper, passports, ID cards and packaging boxes. Other shaped position guides could be provided to accept items of different shapes, such as circular items including CDs and DVDs, or items with curved surfaces such as cylindrical packaging containers. Where only one size and shape of item is to be scanned a slot may be provided for receiving the item.

Thus there has now been described an example of a scanning and signature generation apparatus suitable for use in a security mechanism for remote verification of article authenticity. Such a system can be deployed to allow an article to be scanned in more than one location, and for a check to be performed to ensure that the article is the same article in both instances, and optionally for a check to performed to ensure that the article has not been tampered with between initial and subsequent scannings.

Figure 5:
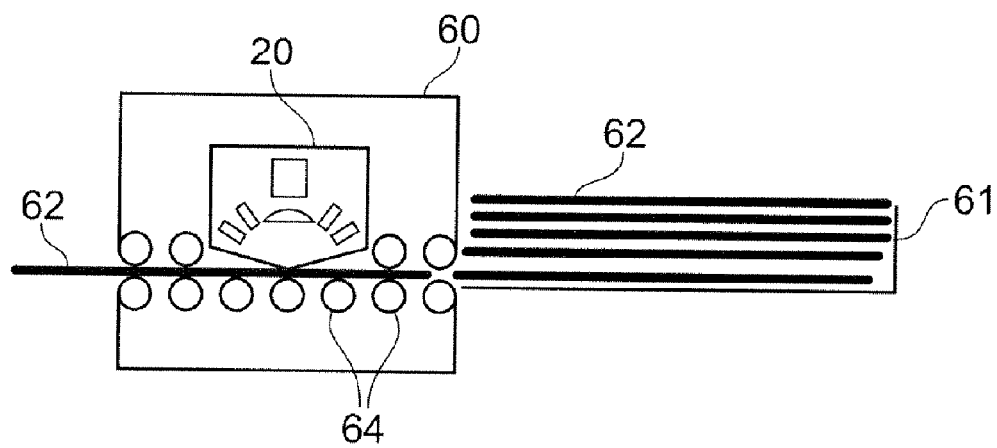
FIG. 5 is a perspective view showing another example of an external form for the reader of FIG. 1.

FIG. 5 shows an example of an alternative physical configuration for a reader where a document feeder is provided to ensure that article placement is consistent. In this example, a housing 60 is provided, having an article feed tray 61 attached thereto. The tray 61 can hold one or more articles 62 for scanning by the reader. A motor can drive feed rollers 64 to carry an article 62 through the device and across a scanning aperture of an optics subassembly 20 as described above. Thus the article 62 can be scanned by the optics subassembly 20 in the manner discussed above in a manner whereby the relative motion between optics subassembly and article is created by movement of the article. Using such a system, the motion of the scanned item can be controlled using the motor with sufficient linearity that the use of distance marks and linearisation processing may be unnecessary. The apparatus could follow any conventional format for document scanners, photocopiers or document management systems. Such a scanner may be configured to handle line-feed sheets (where multiple sheets are connected together by, for example, a perforated join) as well as or instead of handing single sheets.

Thus there has now been described an apparatus suitable for scanning articles in an automated feeder type device. Depending upon the physical arrangement of the feed arrangement, the scanner may be able to scan one or more single sheets of material, joined sheets or material or three-dimensional items such as packaging cartons.

Figure 6A:
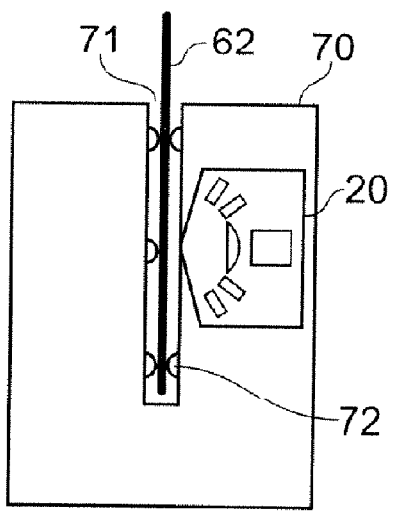
FIG. 6A is schematic cross-sectional view through an alternative reader configuration.

FIG. 6 show examples of further alternative physical configurations for a reader. In this example, the article is moved through the reader by a user. As shown in FIG. 6A, a reader housing 70 can be provided with a slot 71 therein for insertion of an article for scanning. An optics subassembly 20 can be provided with a scanning aperture directed into the slot 71 so as to be able to scan an article 62 passed through the slot. Additionally, guide elements 72 may be provided in the slot 71 to assist in guiding the article to the correct focal distance from the optics sub-assembly 20 and/or to provide for a constant speed passage of the article through the slot.

Figure 6B:
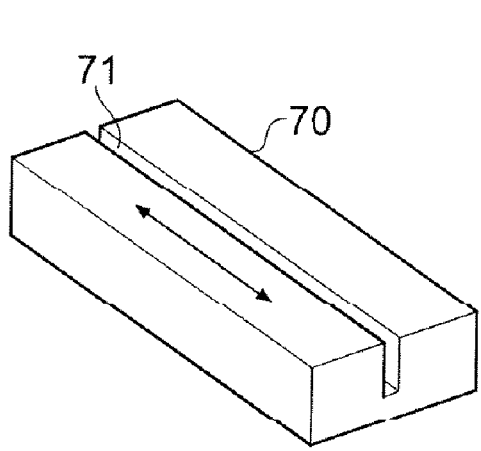
FIG. 6B is a perspective view of another alternative reader configuration.
Figure 6C:
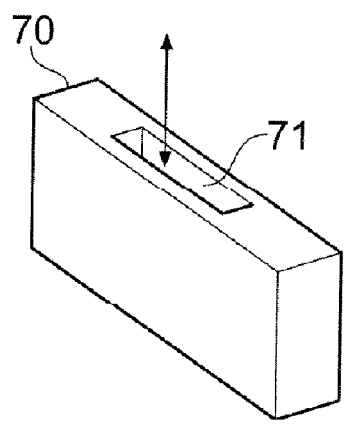
FIG. 6C is a perspective view of another alternative reader configuration.

As shown in FIG. 6B, the reader may be configured to scan the article when moved along a longitudinal slot through the housing 70, as indicated by the arrow. Alternatively, as shown in FIG. 6C, the reader may be configured to scan the article when inserted into or removed from a slot extending into the reader housing 70, as indicated by the arrow. Scanners of this type may be particularly suited to scanning articles which are at least partially rigid, such as card, plastic or metal sheets. Such sheets may, for example, be plastic items such as credit cards or other bank cards.

Thus there have now been described an arrangement for manually initiated scanning of an article. This could be used for scanning bank cards and/or credit cards. Thereby a card could be scanned at a terminal where that card is presented for use, and a signature taken from the card could be compared to a stored signature for the card to check the authenticity and un-tampered nature of the card. Such a device could also be used, for example in the context of reading a military-style metal ID-tag (which tags are often also carried by allergy sufferers to alert others to their allergy). This could enable medical personnel treating a patient to ensure that the patient being treated was in fact the correct bearer of the tag. Likewise, in a casualty situation, a recovered tag could be scanned for authenticity to ensure that a casualty has been correctly identified before informing family and/or colleagues.

The above-described examples are based on localised excitation with a coherent light beam of small cross-section in combination with detectors that accept light signal scattered over a much larger area that includes the local area of excitation. It is possible to design a functionally equivalent optical system which is instead based on directional detectors that collect light only from localised areas in combination with excitation of a much larger area.

Figure 7A:
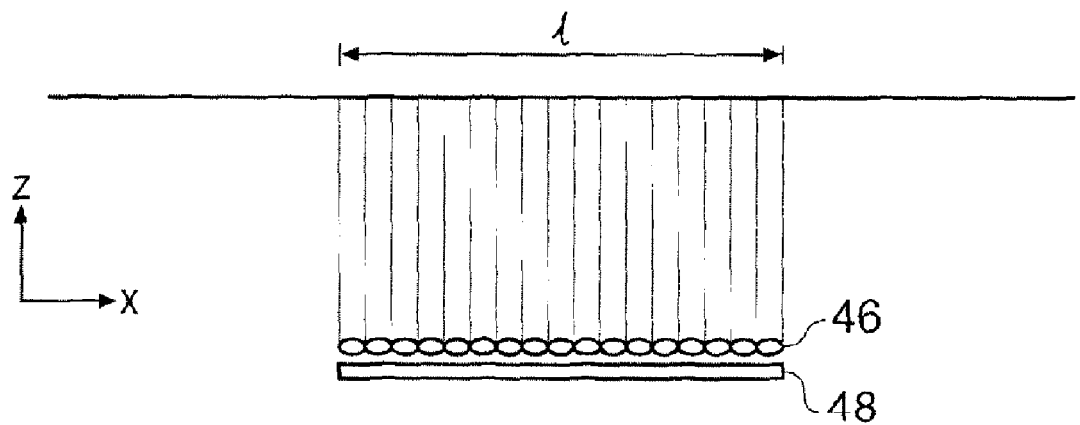
FIG. 7A shows schematically in side view an alternative imaging arrangement for a reader based on directional light collection and blanket illumination.

FIG. 7A shows schematically in side view such an imaging arrangement for a reader which is based on directional light collection and blanket illumination with a coherent beam. An array detector 48 is arranged in combination with a cylindrical microlens array 46 so that adjacent strips of the detector array 48 only collect light from corresponding adjacent strips in the reading volume. With reference to FIG. 2, each cylindrical microlens is arranged to collect light signal from one of the n sampling strips. The coherent illumination can then take place with blanket illumination of the whole reading volume (not shown in the illustration).

A hybrid system with a combination of localised excitation and localised detection may also be useful in some cases.

Figure 7B:
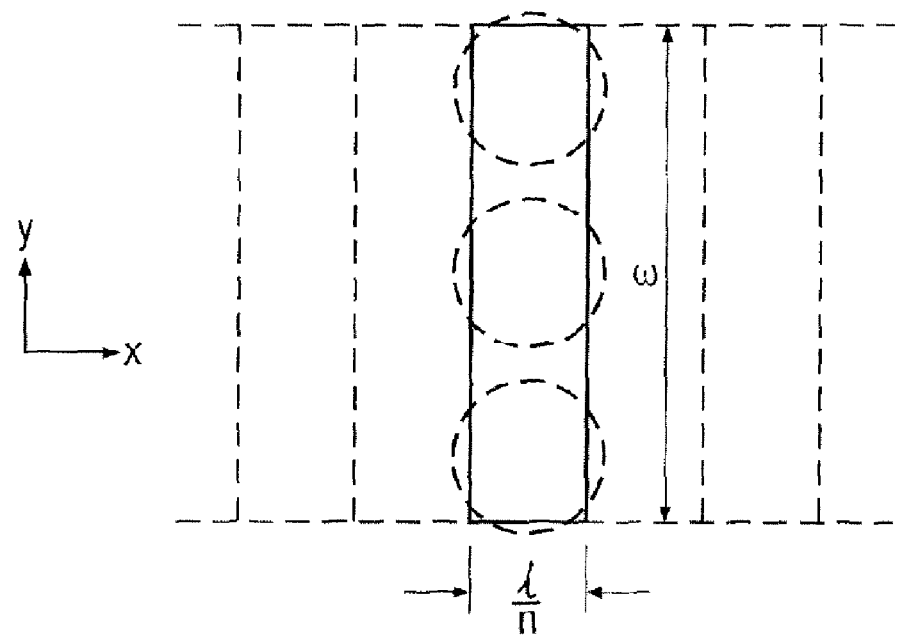
FIG. 7B shows schematically in plan view the optical footprint of a further alternative imaging arrangement for a reader in which directional detectors are used in combination with localised illumination with an elongate beam.

FIG. 7B shows schematically in plan view the optical footprint of such a hybrid imaging arrangement for a reader in which directional detectors are used in combination with localised illumination with an elongate beam. This example may be considered to be a development of the example of FIG. 1 in which directional detectors are provided. In this example three banks of directional detectors are provided, each bank being targeted to collect light from different portions along the 'l x w' excitation strip. The collection area from the plane of the reading volume are shown with the dotted circles, so that a first bank of, for example 2, detectors collects light signal from the upper portion of the excitation strip, a second bank of detectors collects light signal from a middle portion of the excitation strip and a third bank of detectors collects light from a lower portion of the excitation strip. Each bank of detectors is shown having a circular collection area of diameter approximately $l/m$, where m is the number of subdivisions of the excitation strip, where m=3 in the present example. In this way the number of independent data points can be increased by a factor of m for a given scan length $l$. As described further below, one or more of different banks of directional detectors can be used for a purpose other than collecting light signal that samples a speckle pattern. For example, one of the banks may be used to collect light signal in a way optimised for barcode scanning. If this is the case, it will generally be sufficient for that bank to contain only one detector, since there will be no advantage obtaining cross-correlations when only scanning for contrast.

Having now described the principal structural components and functional components of various reader apparatuses, the numerical processing used to determine a signature will now be described. It will be understood that this numerical processing can be implemented for the most part in a computer program that runs on the PC 34 with some elements subordinated to the PIC 30. In alternative examples, the numerical processing could be performed by a dedicated numerical processing device or devices in hardware or firmware.

Figure 8A:
FIG. 8A is a microscope image of a paper surface with the image covering an area of approximately 0.5×0.2 mm.

FIG. 8A is a microscope image of a paper surface with the image covering an area of approximately 0.5×0.2 mm. This figure is included to illustrate that macroscopically flat surfaces, such as from paper, are in many cases highly structured at a microscopic scale. For paper, the surface is microscopically highly structured as a result of the intermeshed network of wood or other fibres that make up the paper. The figure is also illustrative of the characteristic length scale for the wood fibres which is around 10 microns. This dimension has the correct relationship to the optical wavelength of the coherent beam of the present example to cause diffraction and hence speckle, and also diffuse scattering which has a profile that depends upon the fibre orientation. It will thus be appreciated that if a reader is to be designed for a specific class of goods, the wavelength of the laser can be tailored to the structure feature size of the class of goods to be scanned. It is also evident from the figure that the local surface structure of each piece of paper will be unique in that it depends on how the individual wood fibres are arranged. A piece of paper is thus no different from a specially created token, such as the special resin tokens or magnetic material deposits of the prior art, in that it has structure which is unique as a result of it being made by a process governed by laws of nature. The same applies to many other types of article.

Figure 8B:
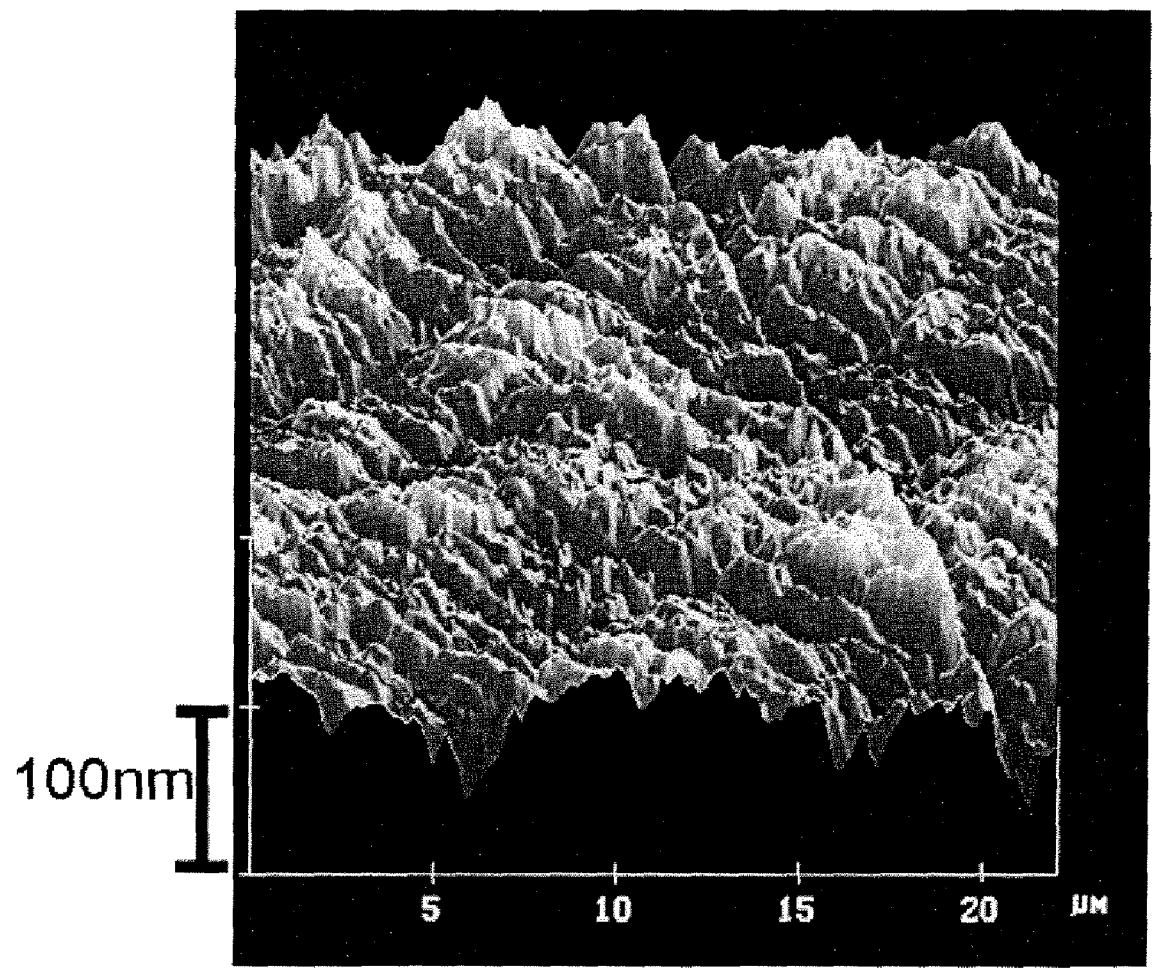
FIG. 8B is a microscope image of a plastic surface with the image covering an area of approximately 0.02×0.02 mm.

FIG. 8B shows an equivalent image for a plastic surface. This atomic force microscopy image clearly shows the uneven surface of the macroscopically smooth plastic surface. As can be surmised from the figure, this surface is smoother than the paper surface illustrated in FIG. 8A, but even this level of surface undulation can be uniquely identified using the signature generation scheme of the present example.

In other words, it can be essentially pointless to go to the effort and expense of making specially prepared tokens, when unique characteristics are measurable in a straightforward manner from a wide variety of every day articles. The data collection and numerical processing of a scatter signal that takes advantage of the natural structure of an article's surface (or interior in the case of transmission) is now described.

Figure 9A:
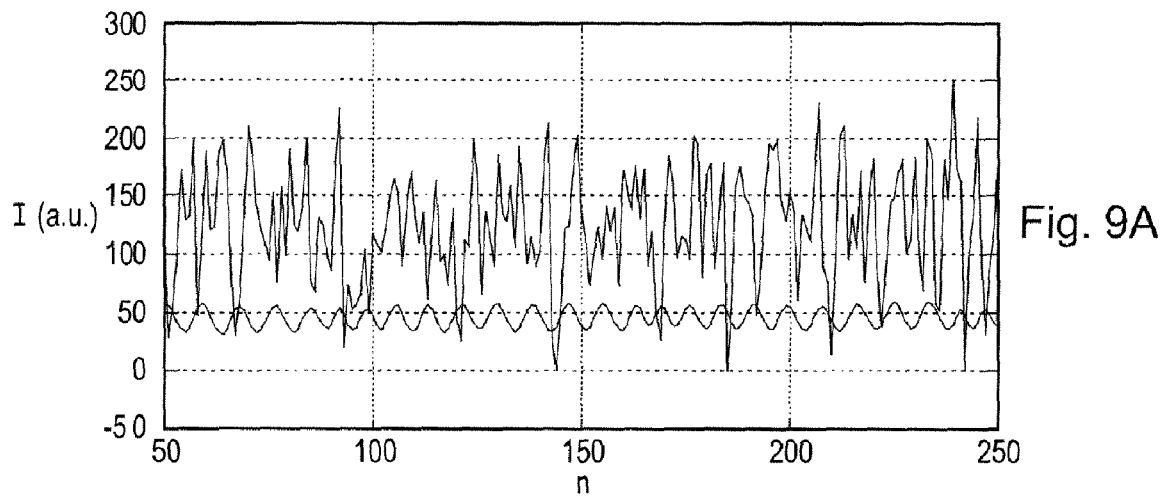
FIG. 9A shows raw data from a single photodetector using the reader of FIG. 1 which consists of a photodetector signal and an encoder signal.

FIG. 9A shows raw data from a single one of the photodetectors 16a ... d of the reader of FIG. 1. The graph plots signal intensity I in arbitrary units (a.u.) against point number n (see FIG. 2). The higher trace fluctuating between I=0–250 is the raw signal data from photodetector 16a. The lower trace is the encoder signal picked up from the markers 28 (see FIG. 2) which is at around I=50.

Figure 9B:
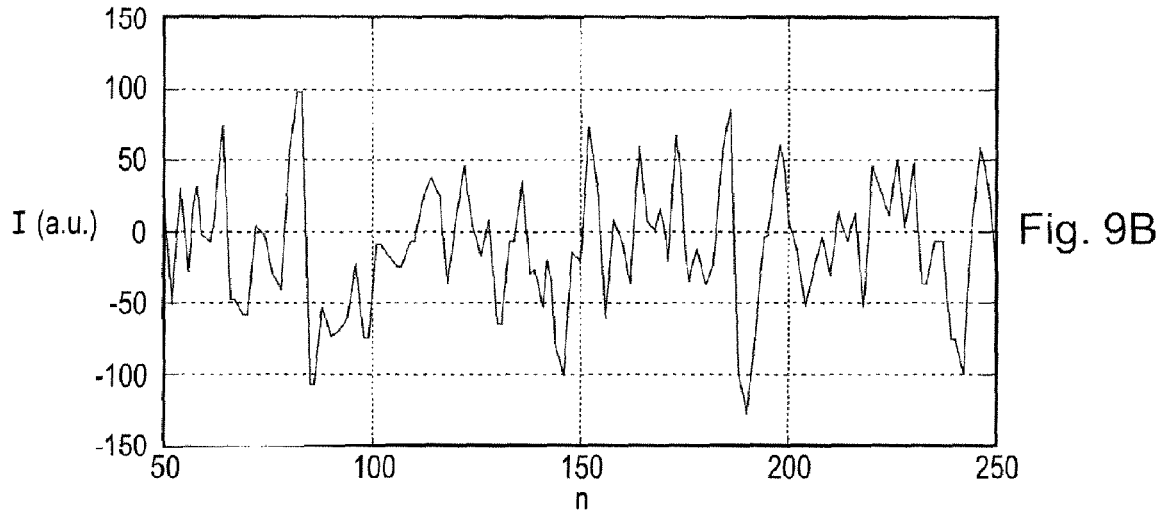
FIG. 9B shows the photodetector data of FIG. 9A after linearisation with the encoder signal and averaging the amplitude.

FIG. 9B shows the photodetector data of FIG. 10A after linearisation with the encoder signal (n.b. although the x axis is on a different scale from FIG. 10A, this is of no significance). As noted above, where a movement of the article relative to the scanner is sufficiently linear, there may be no need to make use of a linearisation relative to alignment marks. In addition, the average of the intensity has been computed and subtracted from the intensity values. The processed data values thus fluctuate above and below zero.

Figure 9C:
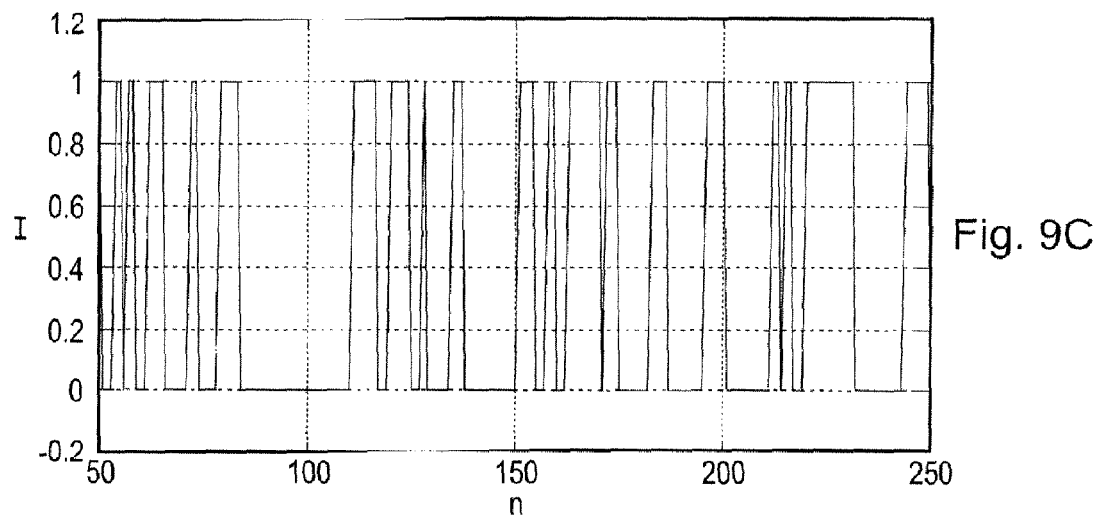
FIG. 9C shows the data of FIG. 9B after digitisation according to the average level.

FIG. 9C shows the data of FIG. 9B after digitisation. The digitisation scheme adopted is a simple binary one in which any positive intensity values are set at value 1 and any negative intensity values are set at zero. It will be appreciated that multi-state digitisation could be used instead, or any one of many other possible digitisation approaches. The main important feature of the digitisation is merely that the same digitisation scheme is applied consistently.

Figure 10:
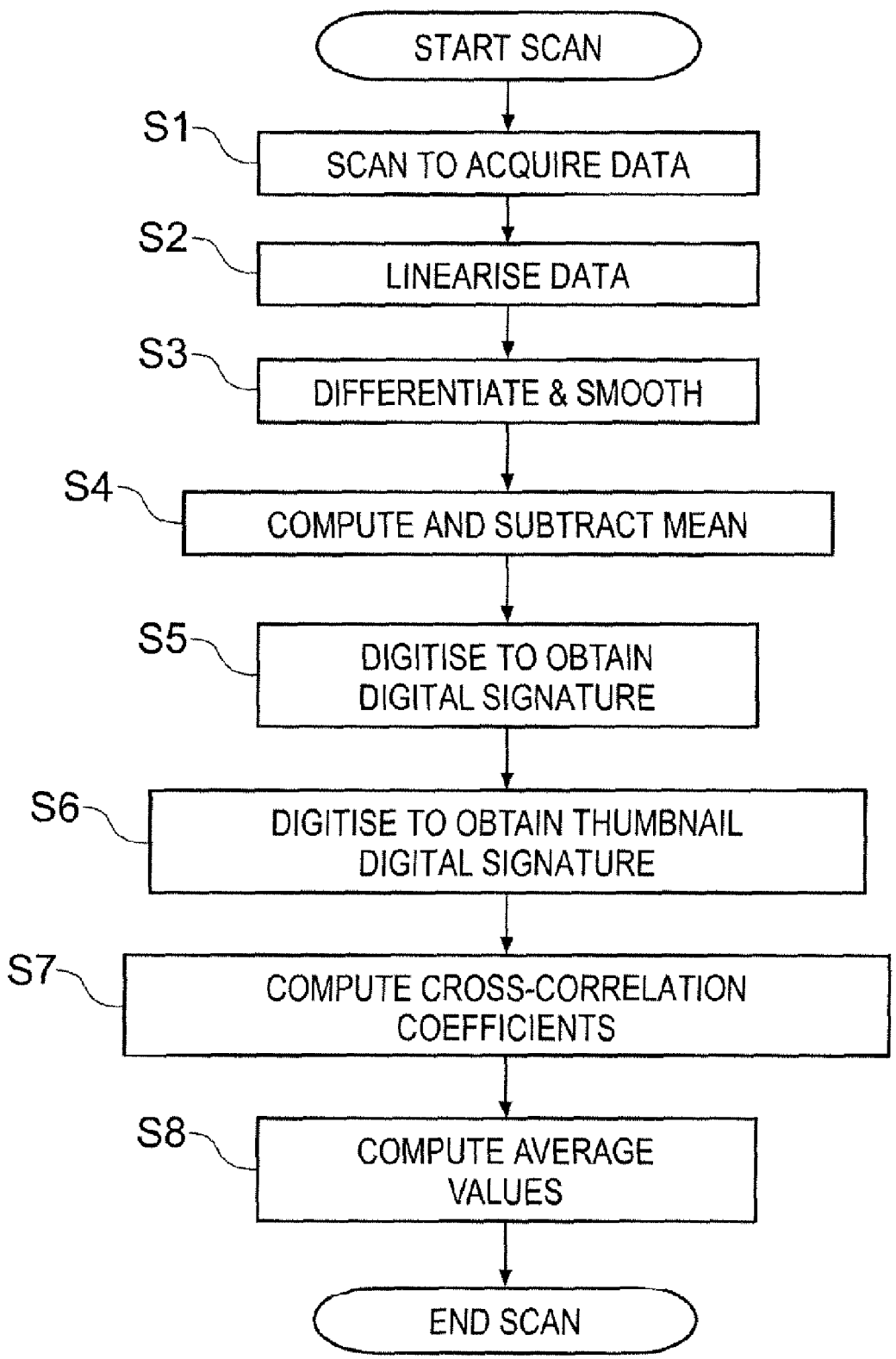
FIG. 10 is a flow diagram showing how a signature of an article is generated from a scan.

FIG. 10 is a flow diagram showing how a signature of an article is generated from a scan.

Step S1 is a data acquisition step during which the optical intensity at each of the photodetectors is acquired approximately every 1 ms during the entire length of scan. Simultaneously, the encoder signal is acquired as a function of time. It is noted that if the scan motor has a high degree of linearisation accuracy (e.g. as would a stepper motor) then linearisation of the data may not be required. The data is acquired by the PIC 30 taking data from the ADC 31. The data points are transferred in real time from the PIC 30 to the PC 34. Alternatively, the data points could be stored in memory in the PIC 30 and then passed to the PC 34 at the end of a scan. The number n of data points per detector channel collected in each scan is defined as N in the following. Further, the value $a_k(i)$ is defined as the i-th stored intensity value from photodetector k, where i runs from 1 to N. Examples of two raw data sets obtained from such a scan are illustrated in FIG. 9A.

Step S2 uses numerical interpolation to locally expand and contract $a_k(i)$ so that the encoder transitions are evenly spaced in time. This corrects for local variations in the motor speed. This step can be performed in the PC 34 by a computer program.

Step S3 is an optional step. If performed, this step numerically differentiates the data with respect to time. It may also be desirable to apply a weak smoothing function to the data. Differentiation may be useful for highly structured surfaces, as it serves to attenuate uncorrelated contributions from the signal relative to correlated (speckle) contributions.

Step S4 is a step in which, for each photodetector, the mean of the recorded signal is taken over the N data points. For each photodetector, this mean value is subtracted from all of the data points so that the data are distributed about zero intensity. Reference is made to FIG. 9B which shows an example of a scan data set after linearisation and subtraction of a computed average.

Step S5 digitises the analogue photodetector data to compute a digital signature representative of the scan. The digital signature is obtained by applying the rule: $a_k(i)>0$ maps onto binary '1' and $a_k(i)<=0$ maps onto binary '0'. The digitised data set is defined as $d_k(i)$ where i runs from 1 to N. The signature of the article may incorporate further components in addition to the digitised signature of the intensity data just described. These further optional signature components are now described.

Step S6 is an optional step in which a smaller 'thumbnail' digital signature is created. This is done either by averaging together adjacent groups of m readings, or more preferably by picking every cth data point, where c is the compression factor of the thumbnail. The latter is preferred since averaging may disproportionately amplify noise. The same digitisation rule used in Step S5 is then applied to the reduced data set. The thumbnail digitisation is defined as $t_k(i)$ where i runs 1 to N/c and c is the compression factor.

Step S7 is an optional step applicable when multiple detector channels exist. The additional component is a cross-correlation component calculated between the intensity data obtained from different ones of the photodetectors. With 2 channels there is one possible cross-correlation coefficient, with 3 channels up to 3, and with 4 channels up to 6 etc. The cross-correlation coefficients are useful, since it has been found that they are good indicators of material type. For example, for a particular type of document, such as a passport of a given type, or laser printer paper, the cross-correlation coefficients always appear to lie in predictable ranges. A normalised cross-correlation can be calculated between $a_k(i)$ and $a_l(i)$, where $k \neq l$ and k,l vary across all of the photodetector channel numbers. The normalised cross-correlation function $\Sigma$ is defined as $$\Gamma(k,l) = \frac{\sum_{i=1}^{N} a_k(i) a_l(i)}{\sqrt{\left(\sum_{i=1}^{N} a_k(i)^2\right)\left(\sum_{i=1}^{N} a_l(i)^2\right)}}$$

Another aspect of the cross-correlation function that can be stored for use in later verification is the width of the peak in the cross-correlation function, for example the full width half maximum (FWHM). The use of the cross-correlation coefficients in verification processing is described further below.

Step S8 is another optional step which is to compute a simple intensity average value indicative of the signal intensity distribution. This may be an overall average of each of the mean values for the different detectors or an average for each detector, such as a root mean square (rms) value of $a_k(i)$. If the detectors are arranged in pairs either side of normal incidence as in the reader described above, an average for each pair of detectors may be used. The intensity value has been found to be a good crude filter for material type, since it is a simple indication of overall reflectivity and roughness of the sample. For example, one can use as the intensity value the unnormalised rms value after removal of the average value, i.e. the DC background.

The signature data obtained from scanning an article can be compared against records held in a signature database for verification purposes and/or written to the database to add a new record of the signature to extend the existing database.

A new database record will include the digital signature obtained in Step S5. This can optionally be supplemented by one or more of its smaller thumbnail version obtained in Step S6 for each photodetector channel, the cross-correlation coefficients obtained in Step S7 and the average value(s) obtained in Step S8. Alternatively, the thumbnails may be stored on a separate database of their own optimised for rapid searching, and the rest of the data (including the thumbnails) on a main database.

Figure 11:
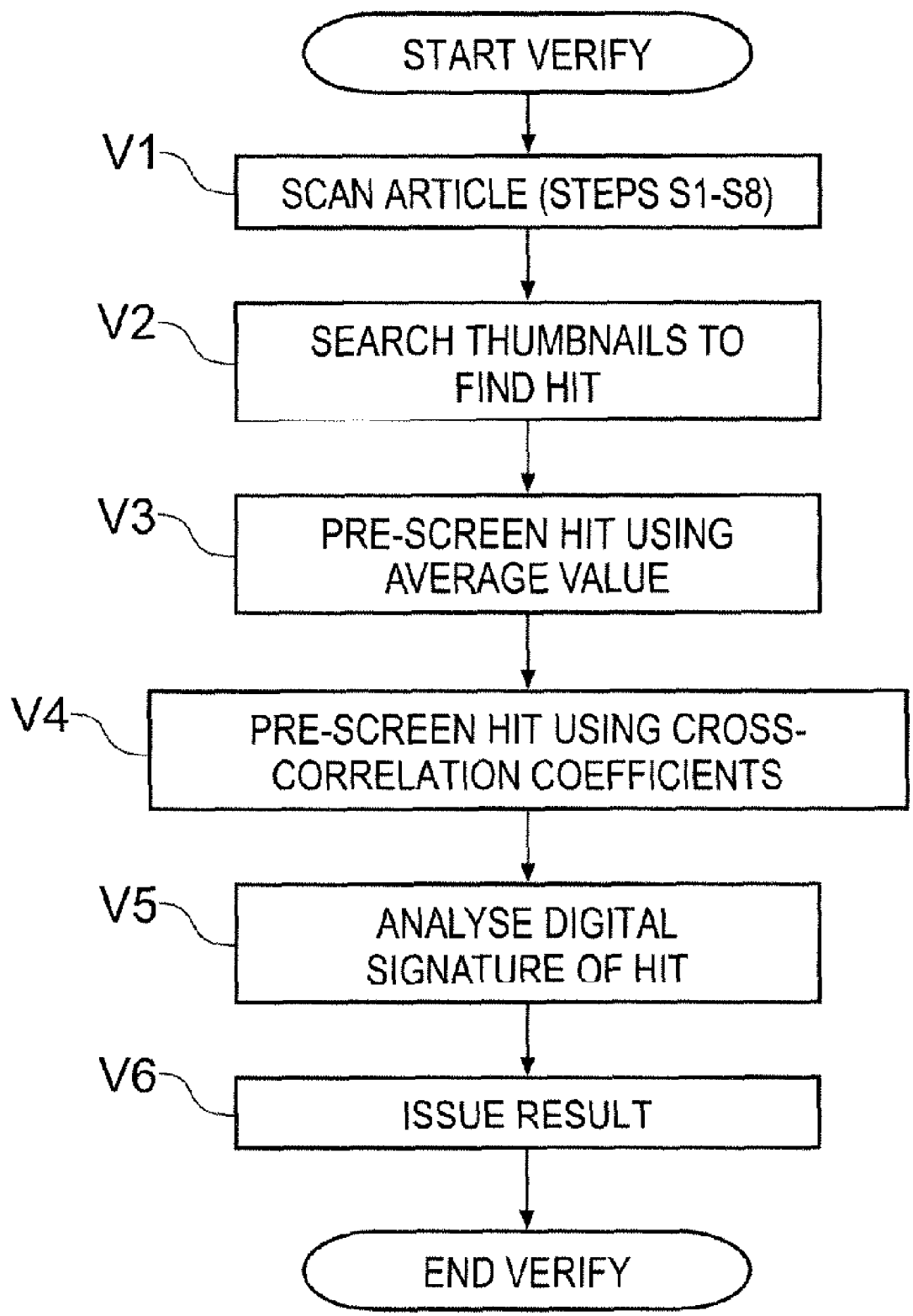
FIG. 11 is a flow diagram showing how a signature of an article obtained from a scan can be verified against a signature database.

FIG. 11 is a flow diagram showing how a signature of an article obtained from a scan can be verified against a signature database.

In a simple implementation, the database could simply be searched to find a match based on the full set of signature data. However, to speed up the verification process, the process can use the smaller thumbnails and pre-screening based on the computed average values and cross-correlation coefficients as now described.

Verification Step V1 is the first step of the verification process, which is to scan an article according to the process described above, i.e. to perform Scan Steps S1 to S8.

Verification Step V2 takes each of the thumbnail entries and evaluates the number of matching bits between it and $t_k(i+j)$, where j is a bit offset which is varied to compensate for errors in placement of the scanned area. The value of j is determined and then the thumbnail entry which gives the maximum number of matching bits. This is the 'hit' used for further processing.

Verification Step V3 is an optional pre-screening test that is performed before analysing the full digital signature stored for the record against the scanned digital signature. In this pre-screen, the rms values obtained in Scan Step S8 are compared against the corresponding stored values in the database record of the hit. The 'hit' is rejected from further processing if the respective average values do not agree within a pre-defined range. The article is then rejected as non-verified (i.e. jump to Verification Step V6 and issue fail result).

Verification Step V4 is a further optional pre-screening test that is performed before analysing the full digital signature. In this pre-screen, the cross-correlation coefficients obtained in Scan Step S7 are compared against the corresponding stored values in the database record of the hit. The 'hit' is rejected from further processing if the respective cross-correlation coefficients do not agree within a predefined range. The article is then rejected as non-verified (i.e. jump to Verification Step V6 and issue fail result).

Another check using the cross-correlation coefficients that could be performed in Verification Step V4 is to check the width of the peak in the cross-correlation function, where the cross-correlation function is evaluated by comparing the value stored from the original scan in Scan Step S7 above and the re-scanned value:

$$\Gamma_{k,l}(j) = \frac{\sum_{i=1}^{N} a_k(i) a_l(i+j)}{\sqrt{\left(\sum_{i=1}^{N} a_k(i)^2\right)\left(\sum_{i=1}^{N} a_l(i)^2\right)}}$$

If the width of the re-scanned peak is significantly higher than the width of the original scan, this may be taken as an indicator that the re-scanned article has been tampered with or is otherwise suspicious. For example, this check should beat a fraudster who attempts to fool the system by printing a bar code or other pattern with the same intensity variations that are expected by the photodetectors from the surface being scanned.

Verification Step V5 is the main comparison between the scanned digital signature obtained in Scan Step S5 and the corresponding stored values in the database record of the hit. The full stored digitised signature, $d_k^{db}(i)$ is split into n blocks of q adjacent bits on k detector channels, i.e. there are qk bits per block. A typical value for q is 4 and a typical value for k is 4, making typically 16 bits per block. The qk bits are then matched against the qk corresponding bits in the stored digital signature $d_k^{db}(i+j)$. If the number of matching bits within the block is greater or equal to some pre-defined threshold $z_{thresh}$, then the number of matching blocks is incremented. A typical value for $z_{thresh}$ is 13. This is repeated for all n blocks. This whole process is repeated for different offset values of j, to compensate for errors in placement of the scanned area, until a maximum number of matching blocks is found. Defining M as the maximum number of matching blocks, the probability of an accidental match is calculated by evaluating:

$$p(M) = \sum_{w=n-M}^{n} s^w (1-s)^{n-w} {}_w^n C$$

where s is the probability of an accidental match between any two blocks (which in turn depends upon the chosen value of $z_{threshold}$), M is the number of matching blocks and p(M) is the probability of M or more blocks matching accidentally. The value of s is determined by comparing blocks within the data base from scans of different objects of similar materials, e.g. a number of scans of paper documents etc. For the case of q=4, k=4 and $z_{threshold}$=13, we typical value of s is 0.1. If the qk bits were entirely independent, then probability theory would give s=0.01 for $z_{threshold}$=13. The fact that a higher value is found empirically is because of correlations between the k detector channels and also correlations between adjacent bits in the block due to a finite laser spot width. A typical scan of a piece of paper yields around 314 matching blocks out of a total number of 510 blocks, when compared against the data base entry for that piece of paper. Setting M=314, n=510, s=0.1 for the above equation gives a probability of an accidental match of $10^{-177}$.

Verification Step V6 issues a result of the verification process. The probability result obtained in Verification Step V5 may be used in a pass/fail test in which the benchmark is a pre-defined probability threshold. In this case the probability threshold may be set at a level by the system, or may be a variable parameter set at a level chosen by the user. Alternatively, the probability result may be output to the user as a confidence level, either in raw form as the probability itself, or in a modified form using relative terms (e.g. no match/poor match/good match/excellent match) or other classification.

It will be appreciated that many variations are possible. For example, instead of treating the cross-correlation coefficients as a pre-screen component, they could be treated together with the digitised intensity data as part of the main signature. For example the cross-correlation coefficients could be digitised and added to the digitised intensity data. The cross-correlation coefficients could also be digitised on their own and used to generate bit strings or the like which could then be searched in the same way as described above for the thumbnails of the digitised intensity data in order to find the hits.

Thus there have now been described a number of examples arrangements for scanning an article to obtain a signature based upon intrinsic properties of that article. There have also been described examples of how that signature can be generated from the data collected during the scan, and how the signature can be compared to a later scan from the same or a different article to provide a measure of how likely it is that the same article has been scanned in the later scan.

Such a system has many applications, amongst which are security and confidence screening of items for fraud prevention and item traceability.

In some examples, the method for extracting a signature from a scanned article can be optimised to provide reliable recognition of an article despite deformations to that article caused by, for example, stretching or shrinkage. Such stretching or shrinkage of an article may be caused by, for example, water damage to a paper or cardboard based article.

Also, an article may appear to a scanner to be stretched or shrunk if the relative speed of the article to the sensors in the scanner is non-linear. This may occur if, for example the article is being moved along a conveyor system, or if the article is being moved through a scanner by a human holding the article. An example of a likely scenario for this to occur is where a human scans, for example, a bank card using a scanner such as that described with reference to FIGS. 6A, 6B and 6C above.

As described above, where a scanner is based upon a scan head which moves within the scanner unit relative to an article held stationary against or in the scanner, then linearisation guidance can be provided by the optional distance marks 28 to address any non-linearities in the motion of the scan head. Where the article is moved by a human, these non-linearities can be greatly exaggerated To address recognition problems which could be caused by these non-linear effects, it is possible to adjust the analysis phase of a scan of an article. Thus a modified validation procedure will now be described with reference to FIG. 12. The process implemented in this example uses a block-wise analysis of the data to address the non-linearities.

The process carried out in accordance with FIG. 12, can include some or all of the steps of smoothing and differentiating the data, computing and subtracting the mean, and digitisation for obtaining the signature and thumbnail described with reference to FIG. 10, but are not shown in FIG. 12 so as not to obscure the content of that figure.

Figure 12:
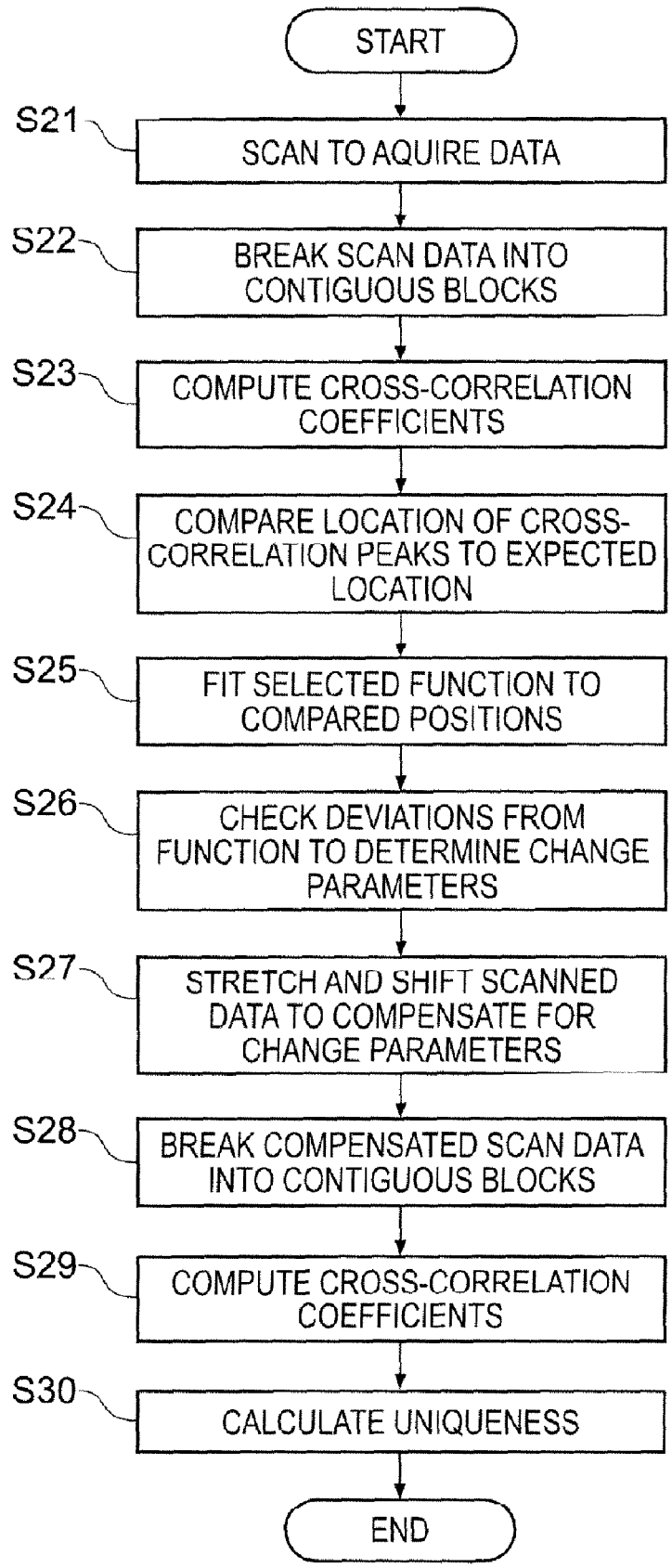
FIG. 12 is a flow diagram showing how the verification process of FIG. 11 can be altered to account for non-idealities in a scan.

As shown in FIG. 12, the scanning process for a validation scan using a block-wise analysis starts at step S21 by performing a scan of the article to acquire the date describing the intrinsic properties of the article. This scanned data is then divided into contiguous blocks (which can be performed before or after digitisation and any smoothing/differentiation or the like) at step S22. In one example, a scan length of 64 mm is divided into eight equal length blocks. Each block therefore represents a subsection of scanned area of the scanned article.

For each of the blocks, a cross-correlation is performed against the equivalent block for each stored signature with which it is intended that article be compared at step S23. This can be performed using a thumbnail approach with one thumbnail for each block. The results of these cross-correlation calculations are then analysed to identify the location of the cross-correlation peak. The location of the cross-correlation peak is then compared at step S24 to the expected location of the peak for the case were a perfectly linear relationship to exist between the original and later scans of the article.

Figure 13A:
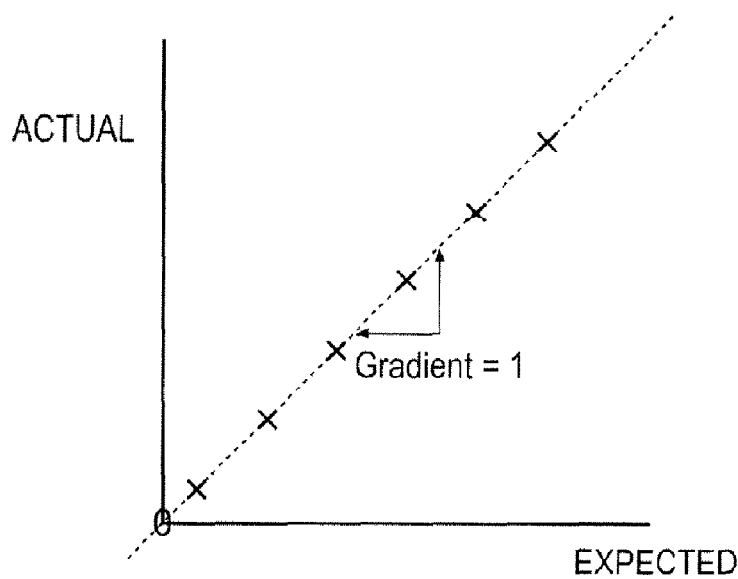
FIG. 13A shows an example of cross-correlation data data gathered from a scan.
Figure 13B:
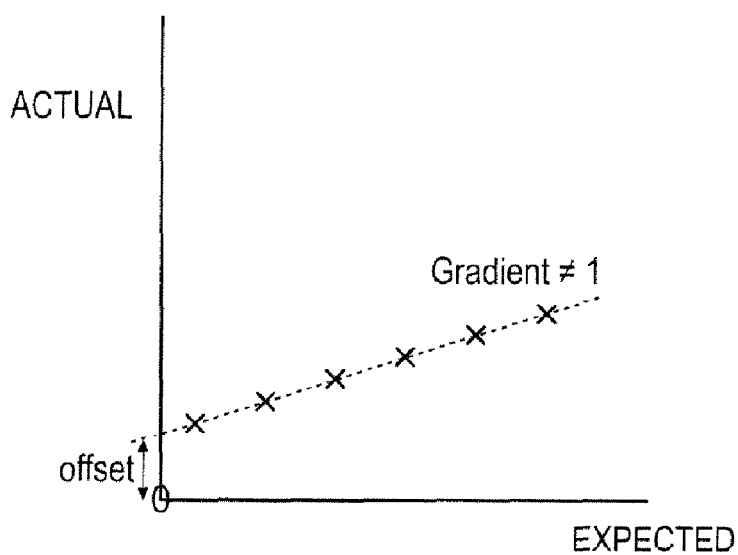
FIG. 13*b* shows an example of cross-correlation data data gathered from a scan where the scanned article is distorted.
Figure 13C:
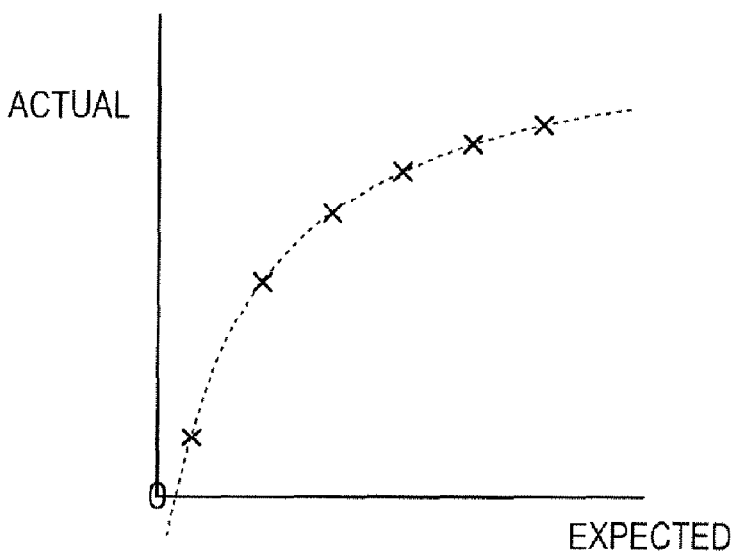
FIG. 13C shows an example of cross-correlation data data gathered from a scan where the scanned article is scanned at non-linear speed.
Figure 14:
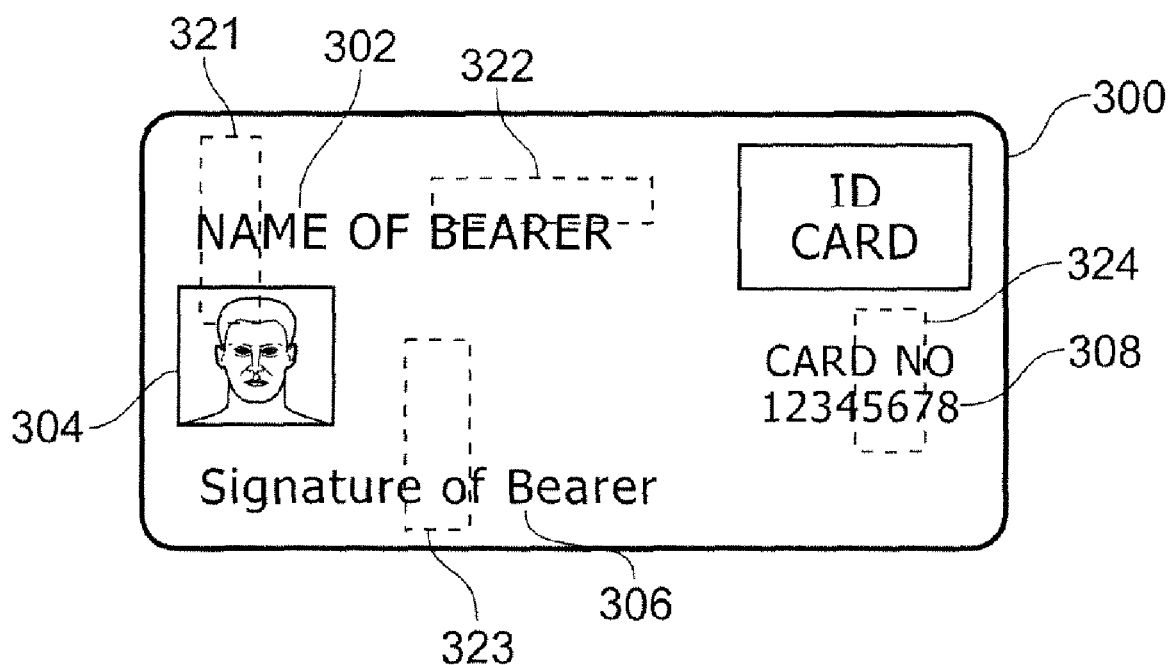
FIG. 14 is a schematic representation of an article for authenticity verification.

This relationship can be represented graphically as shown in FIGS. 13A, 13B and 13C. In the example of FIG. 13A, the cross-correlation peaks are exactly where expected, such that the motion of the scan head relative to the article has been perfectly linear and the article has not experienced stretch or shrinkage. Thus a plot of actual peak positions against expected peak results in a straight line which passes through the origin and has a gradient of 1.

In the example of FIG. 13B, the cross-correlation peaks are closer together than expected, such that the gradient of a line of best fit is less than one. Thus the article has shrunk relative to its physical characteristics upon initial scanning. Also, the best fit line does not pass through the origin of the plot. Thus the article is shifted relative to the scan head compared to its position upon initial scanning.

In the example of FIG. 13C, the cross correlation peaks do not form a straight line. In this example, they approximately fit to a curve representing a $y^2$ function. Thus the movement of the article relative to the scan head has slowed during the scan. Also, as the best fit curve does not cross the origin, it is clear that the article is shifted relative to its position upon initial scanning.

A variety of functions can be test-fitted to the plot of points of the cross-correlation peaks to find a best-fitting function. Thus curves to account for stretch, shrinkage, misalignment, acceleration, deceleration, and combinations thereof can be used. Examples of suitable functions can include straight line functions, exponential functions, a trigonometric functions, $x^2$ functions and $x^3$ functions.

Once a best-fitting function has been identified at step S25, a set of change parameters can be determined which represent how much each cross-correlation peak is shifted from its expected position at step S26. These compensation parameters can then, at step S27, be applied to the data from the scan taken at step S21 in order substantially to reverse the effects of the shrinkage, stretch, misalignment, acceleration or deceleration on the data from the scan. As will be appreciated, the better the best-fit function obtained at step S25 fits the scan data, the better the compensation effect will be.

The compensated scan data is then broken into contiguous blocks at step S28 as in step S22. The blocks are then individually cross-correlated with the respective blocks of data from the stored signature at step S29 to obtain the cross-correlation coefficients. This time the magnitude of the cross-correlation peaks are analysed to determine the uniqueness factor at step S29. Thus it can be determined whether the scanned article is the same as the article which was scanned when the stored signature was created.

Accordingly, there has now been described an example of a method for compensating for physical deformations in a scanned article, and for non-linearities in the motion of the article relative to the scanner. Using this method, a scanned article can be checked against a stored signature for that article obtained from an earlier scan of the article to determine with a high level of certainty whether or not the same article is present at the later scan. Thereby an article constructed from easily distorted material can be reliably recognised. Also, a scanner where the motion of the scanner relative to the article may be non-linear can be used, thereby allowing the use of a low-cost scanner without motion control elements.

Another characteristic of an article which can be detected using a block-wise analysis of a signature generated based upon an intrinsic property of that article is that of localised damage to the article. For example, such a technique can be used to detect modifications to an article made after an initial record scan.

For example, many documents, such as passports, ID cards and driving licenses, include photographs of the bearer. If an authenticity scan of such an article includes a portion of the photograph, then any alteration made to that photograph will be detected. Taking an arbitrary example of splitting a signature into 10 blocks, three of those blocks may cover a photograph on a document and the other seven cover another part of the document, such as a background material. If the photograph is replaced, then a subsequent rescan of the document can be expected to provide a good match for the seven blocks where no modification has occurred, but the replaced photograph will provide a very poor match. By knowing that those three blocks correspond to the photograph, the fact that all three provide a very poor match can be used to automatically fail the validation of the document, regardless of the average score over the whole signature.

Also, many documents include written indications of one or more persons, for example the name of a person identified by a passport, driving licence or identity card, or the name of a bank account holder. Many documents also include a place where written signature of a bearer or certifier is applied. Using a block-wise analysis of a signature obtained therefrom for validation can detect a modification to alter a name or other important word or number printed or written onto a document. A block which corresponds to the position of an altered printing or writing can be expected to produce a much lower quality match than blocks where no modification has taken place. Thus a modified name or written signature can be detected and the document failed in a validation test even if the overall match of the document is sufficiently high to obtain a pass result.

An example of an identity card 300 is shown in FIG. 300. The identity card 300 includes a printed bearer name 302, a photograph of the bearer 304, a signature of the bearer 306 (which may be written onto the card, or printed from a scan of a written signature or a signature captured electronically), and a printed card number 308. In order to protect against fraudulent alteration to the identity card, a scan area for generating a signature based upon an intrinsic property of the card can include one or more of those elements. Various example scan areas are marked in FIG. 15 to illustrate the possibilities. Example scan area 321 includes part of the printed name 302 and part of the photograph 304. Example scan area 322 includes part of the printed name. Example scan area 323 includes part of the signature 306. Example scan area 324 includes part of the card number 308.

The area and elements selected for the scan area can depend upon a number of factors, including the element of the document which it is most likely that a fraudster would attempt to alter. For example, for any document including a photograph the most likely alteration target will usually be the photograph as this visually identifies the bearer. Thus a scan area for such a document might beneficially be selected to include a portion of the photograph. Another element which may be subjected to fraudulent modification is the bearer's signature, as it is easy for a person to pretend to have a name other than their own, but harder to copy another person's signature. Therefore for signed documents, particularly those not including a photograph, a scan area may beneficially include a portion of a signature on the document.

In the general case therefore, it can be seen that a test for authenticity of an article can comprise a test for a sufficiently high quality match between a verification signature and a record signature for the whole of the signature, and a sufficiently high match over at least selected blocks of the signatures. Thus regions important to the assessing the authenticity of an article can be selected as being critical to achieving a positive authenticity result.

In some examples, blocks other than those selected as critical blocks may be allowed to present a poor match result. Thus a document may be accepted as authentic despite being torn or otherwise damaged in parts, so long as the critical blocks provide a good match and the signature as a whole provides a good match.

Thus there have now been described a number of examples of a system, method and apparatus for identifying localised damage to an article, and for rejecting an inauthentic an article with localised damage or alteration in predetermined regions thereof. Damage or alteration in other regions may be ignored, thereby allowing the document to be recognised as authentic.

In some scanner apparatuses, it is also possible that it may be difficult to determine where a scanned region starts and finishes. Of the examples discussed above, this is most problematic for the example of FIG. 6B, where an article to be scanned passes through a slot, such that the scan head may "see" more of an article than the intended scan area. One approach to addressing this difficulty would be to define the scan area as starting at the edge of the article. As the data received at the scan head will undergo a clear step change when an article is passed though what was previously free space, the data retrieved at the scan head can be used to determine where the scan starts.

In this example, the scan head is operational prior to the application of the article to the scanner. Thus initially the scan head receives data corresponding to the unoccupied space in front of the scan head. As the article is passed in front of the scan head, the data received by the scan head immediately changes to be data describing the article. Thus the data can be monitored to determine where the article starts and all data prior to that can be discarded. The position and length of the scan area relative to the article leading edge can be determined in a number of ways. The simplest is to make the scan area the entire length of the article, such that the end can be detected by the scan head again picking up data corresponding to free space. Another method is to start and/or stop the recorded data a predetermined number of scan readings from the leading edge. Assuming that the article always moves past the scan head at approximately the same speed, this would result in a consistent scan area. Another alternative is to use actual marks on the article to start and stop the scan region, although this may require more work, in terms of data processing, to determine which captured data corresponds to the scan area and which data can be discarded.

Thus there has now been described an number of techniques for scanning an item to gather data based on an intrinsic property of the article, compensating if necessary for damage to the article or non-linearities in the scanning process, and comparing the article to a stored signature based upon a previous scan of an article to determine whether the same article is present for both scans.

When using a biometric technique such as the identity technique described with reference to FIGS. 1 to 14 above for the verification of the authenticity or identity of an article, difficulties can arise with the reproducibility of signatures based upon biometric characteristics. In particular, as well as the inherent tendency for a biometric signature generation system to return slightly different results in each signature generated from an article, where an article is subjected to a signature generation process at different signature generation apparatuses and at different times there is the possibility that a slightly different portion of the article is presented on each occasion, making reliable verification more difficult.

Examples of systems, methods and apparatuses for addressing these difficulties will now be described. First, with reference to FIG. 15, a multi-scan head signature generation apparatus for database creation will be described.

Figure 15:
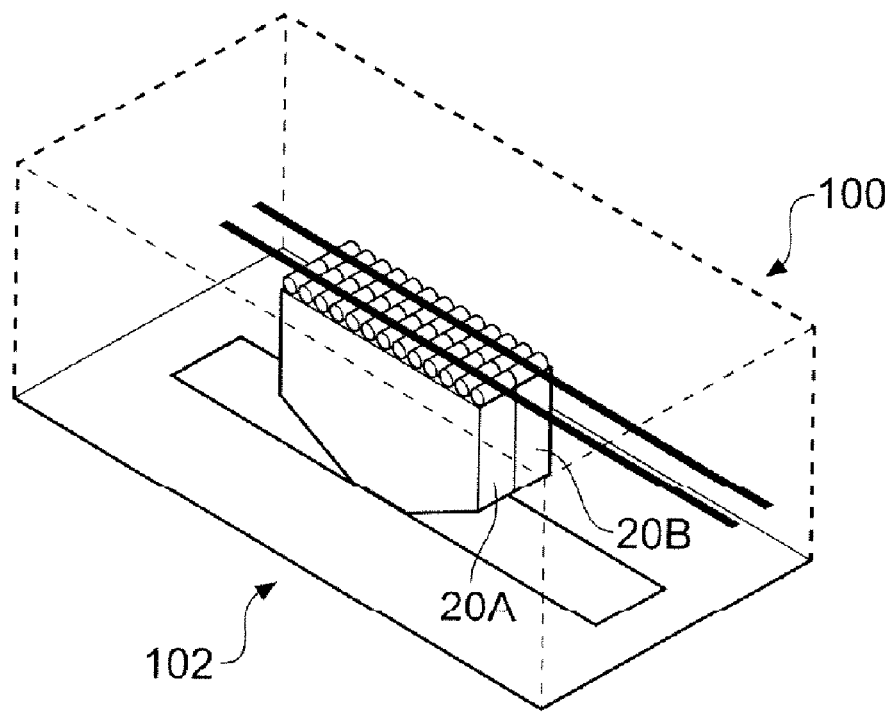
FIG. 15 is a schematic cut-away perspective view of a multi-scan head scanner.

As shown in FIG. 15, a reader unit 100 can include two optic subassemblies 20, each operable to create a signature for an article presented in a reading volume 102 of the reader unit. Thus an item presented for scanning to create a signature for recording of the item in an item database against which the item can later be verified, can be scanned twice, to create two signatures, spatially offset from one another by a likely alignment error amount. Thus a later scan of the item for identification or authenticity verification can be matched against both stored signatures. In some examples, a match against one of the two stored signatures can be considered as a successful match.

In some examples, further read heads can be used, such that three, four or more signatures are created for each item. Each scan head can be offset from the others in order to provide signatures from positions adjacent the intended scan location. Thus greater robustness to article misalignment on verification scanning can be provided.

The offset between scan heads can be selected dependent upon factors such as a width of scanned portion of the article, size of scanned are relative to the total article size, likely misalignment amount during verification scanning, and article material.

Thus there has now been described a system for scanning an article to create a signature database against which an article can be checked to verify the identity and/or authenticity of the article.

Figure 16:
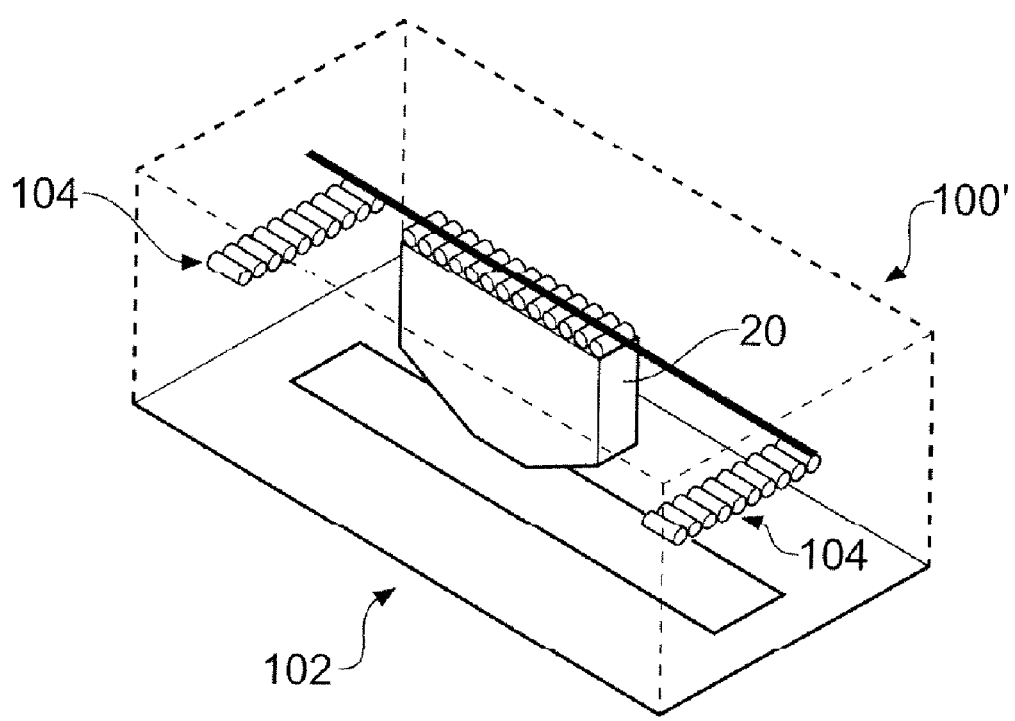
FIG. 16 is a schematic cut-away perspective view of a multi-scan head position scanner.

An example of another system for providing multiple signatures in an article database will now be describe with reference to FIG. 16.

As shown in FIG. 16, a reader unit 100' can have a single optic subassembly 20 and an alignment adjustment unit 104. In use, the alignment adjustment unit 104 can alter the alignment of the optics subassembly 20 relative to the reading volume 102 of the reader unit. Thus an article placed in the reading volume can be scanned multiple times by the optics subassembly 20 in different positions so as to create multiple signatures for the article. In the present example, the alignment adjustment unit 104 can adjust the optics subassembly to read from two different locations. Thus a later scan of the item for identification or authenticity verification can be matched against both stored signatures. In some examples, a match against one of the two stored signatures can be considered as a successful match.

In some examples, further read head positions can be used, such that three, four or more signatures are created for each item. Each scan head position can be offset from the others in order to provide signatures from positions adjacent the intended scan location. Thus greater robustness to article misalignment on verification scanning can be provided.

The offset between scan head positions can be selected dependent upon factors such as a width of scanned portion of the article, size of scanned are relative to the total article size, likely misalignment amount during verification scanning, and article material.

Thus there has now been described another example of a system for scanning an article to create a signature database against which an article can be checked to verify the identity and/or authenticity of the article.

Although it has been described above that a scanner used for record scanning (i.e. scanning of articles to create reference signatures against which the article can later be validated) can use multiple scan heads and/or scan head positions to create multiple signatures for an article, it is also possible to use a similar system for later validation scanning.

For example, a scanner for use in a validation scan may have multiple read heads to enable multiple validation scan signatures to be generated. Each of these multiple signatures can be compared to a database of recorded signatures, which may itself contain multiple signatures for each recorded item. Due to the fact that, although the different signatures for each item may vary these signatures will all still be extremely different to any signatures for any other items, a match between any one record scan signature and any one validation scan signature should provide sufficient confidence in the identity and/or authenticity of an item.

A multiple read head validation scanner can be arranged much as described with reference to FIG. 15 above. Likewise, a multiple read head position validation scanner can be arranged much as described with reference to FIG. 16 above. Also, for both the record and validation scanners, a system of combined multiple scan heads and multiple scan head positions per scan head can be combined into a single device.

Although the embodiments above have been described in considerable detail, numerous variations and modifications will become apparent to those skilled in the art once the above disclosure is fully appreciated. It is intended that the following claims be interpreted to embrace all such variations and modifications as well as their equivalents.

The invention claimed is:

1. A system for determining whether an article under test is the same article as a previously tested, the system comprising:
    a signature determination unit operable to determine a signature from an article, the signature determination unit comprising:
    a reading volume for receiving an article;
    a source for generating a coherent beam and directing the coherent beam sequentially onto a plurality of regions of a surface of an article in the reading volume;
    a detector arrangement for collecting a set comprising groups of data points from signals obtained when the coherent beam scatters from an intrinsic structure of the different regions of an article in the reading volume, wherein different ones of the groups of data points relate to scatter from the intrinsic structure of the respective different regions of the article; and
    a data acquisition and processing unit for determining a signature of the article from the set of groups of data points; and
    a comparison unit operable to determining whether an article under test is the same article as a previously tested article by comparing the determined signature to a stored signature for the previously tested article;
    wherein the comparison unit is operable to split the determined signature into blocks of contiguous data and to perform a comparison operation between each block and respective blocks of the stored signature.

2. The system of claim 1, wherein the comparison unit is further operable to compare an attribute of a comparison result from each block comparison to an expected attribute of the block comparison to determine a compensation value for use in determining a comparison result; and wherein the comparison unit is further operable to determine a similarity result between the determined signature and the stored signature, using the compensation value to adjust the determined signature.

3. The system of claim 2, wherein the comparison unit is operable to apply the compensation value to adjust the determined signature to compensate for damage to the access token and/or a non-linearity in the determination of the determined signature.

4. The system of claim 3, wherein the comparison unit is operable to apply the compensation value to adjust the determined signature to compensate for a non-linearity in the relationship between the different parts of the reading volume.

5. The system of claim 2, wherein the comparison unit is operable to compare an actual cross-correlation peak location of a comparison result between a block of the determined signature and the corresponding block of the stored signature to an expected cross correlation peak location to determine the compensation value for use in determining a comparison result.

6. The system of claim 5, wherein the comparison unit is operable to determine the compensation value by estimating a function of best fit to the cross-correlation peak locations for each of the block comparisons, the function of best fit representing an average deviation from the expected cross-correlation peak locations.

7. The system of claim 6, wherein the function of best fit is one of a straight line function, an exponential function, a trigonometric function and an $x^2$ function.

8. The system of claim 7, operable to return a no match result if the determined signature has determined therefor a similarity result lower than a predetermined threshold for each of the stored signatures.

9. The system of claim 1, wherein the reading volume is arranged such that the article can be moved relative to the detector arrangement.

10. The system of claim 1, wherein the detector arrangement is operable to be moved relative to the reading volume.

11. The system of claim 1, operable to compare the determined signature to a plurality of stored signatures.

12. The system of claim 11, operable to find a closest match result between the determined signature and the plurality of stored signatures.

13. The system of claim 1, wherein the comparison unit is operable to calculate a similarity result for each compared block.

14. The system of claim 13, wherein the comparison unit is operable to compare the similarity result for at least one predetermined block to a predetermined similarity threshold.

15. The system of claim 14, wherein a comparison unit is operable to return a negative comparison result in the event of the similarity result for the at least one predetermined block being below a predetermined similarity threshold, regardless of a similarity result for the signatures as a whole.

16. An article identification method, comprising: determining a signature from an article, wherein determining the signature comprises:
    directing coherent radiation sequentially onto a plurality of regions of a surface of an article in the reading volume;
    collecting a set of data points comprising groups of data points from signals obtained when the coherent radiation scatters from intrinsic structure of the article, wherein different ones of the groups relate to scatter from the intrinsic structure of the respective different regions of the article; and
    determining a signature of the article from the set of data points;
    determining whether the article is the same article as a preciously tested article comparing the determined signature to a stored signature for the previously tested article;
    splitting the determined signature into blocks of contiguous data; and
    performing a comparison operation between each block and respective blocks of the stored signature.

17. The method of claim 16, further comprising: comparing an attribute of a comparison result from each block comparison to an expected attribute of the block comparison to determine a compensation value for use in determining a comparison result; and determining a similarity result between the determined signature and the stored signature, using the compensation value to adjust the determined signature.

18. The method of claim 17, further comprising applying the compensation value to adjust the determined signature to compensate for damage to the article and/or a non-linearity in the determination of the determined signature.

19. The method of claim 18, comprising applying the compensation value to adjust the determined signature to compensate for a non-linearity in the relationship between different parts of the article.

20. The method of claim 17, wherein said comparing an attribute of a comparison result from each block comparison to an expected attribute of the block comparison comprises comparing an actual cross-correlation peak location of a comparison result between a block of the determined signature and the corresponding block of the stored signature to an expected cross correlation peak location to determine the compensation value for use in determining a comparison result.

21. The method of claim 20, wherein said determining the compensation value comprises estimating a function of best fit to the cross-correlation peak locations for each of the block comparisons, the function of best fit representing an average deviation from the expected cross-correlation peak locations.

22. The method of claim 21, wherein the function of best fit is one of a straight line function, an exponential function, a trigonometric function and an $x^2$ function.

23. The method of claim 16, wherein collecting the set of data points comprises moving the article can be moved relative to a detector.

24. The method of claim 16, wherein collecting the set of data points comprises moving a detector arrangement relative to the article.

25. The method of claim 16, comprising comparing the determined signature to a plurality stored signatures.

26. The method of claim 25, further comprising finding a closest match result between the determined signature and the plurality of stored signatures.

27. The method of claim 25, further comprising returning a no-match result if the determined signature has determined therefor a similarity result lower than a predetermined threshold for each of the stored signatures.

28. The method of claim 16, further comprising calculating a similarity result for each compared block.

29. The method of claim 28, further comprising comparing the similarity result for at least one predetermined block to a predetermined similarity threshold.

30. The method of claim 29, further comprising returning a negative comparison result in the event of the similarity result for the at least one predetermined block being below a predetermined similarity threshold, regardless of a similarity result for the signatures as a whole.

* * * * *